(12) United States Patent
Jouppi

(10) Patent No.: US 6,346,950 B1
(45) Date of Patent: Feb. 12, 2002

(54) SYSTEM AND METHOD FOR DISPLAY IMAGES USING ANAMORPHIC VIDEO

(75) Inventor: Norman P. Jouppi, Palo Alto, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/315,756

(22) Filed: May 20, 1999

(51) Int. Cl.[7] .................................................. G09G 5/00
(52) U.S. Cl. ...................................... 345/660; 545/667
(58) Field of Search .................................. 345/113, 115, 345/127, 128, 129, 130, 132, 660, 667, 668, 669

(56) References Cited

U.S. PATENT DOCUMENTS

| | | | |
|---|---|---|---|
| 4,098,550 A | 7/1978 | Randolph | 352/69 |
| 4,656,506 A | 4/1987 | Richey | 358/87 |
| 5,613,057 A * | 3/1997 | Caravel | 345/115 |
| 5,639,151 A | 6/1997 | McNelley et al. | 353/98 |
| 5,677,788 A | 10/1997 | Chen et al. | 359/365 |
| 5,777,665 A | 7/1998 | McNelley et al. | 348/20 |
| 5,856,842 A | 1/1999 | Tedesco | 348/20 |
| 5,880,733 A * | 3/1999 | Horvitz et al. | 345/355 |
| 6,005,579 A * | 12/1999 | Sugiyama et al. | 345/355 |
| 6,025,827 A * | 2/2000 | Bullock et al. | 345/115 |
| 6,069,606 A * | 5/2000 | Sciammarella et al. | 345/127 |

OTHER PUBLICATIONS

ProP: Personal Roving Presence, by Eric Paulos and John Canny, http://www.Prop.org/, Jan. 15, 1999.
"ProP: Personal Roving Presence", by Eric Paulos and John Canny 1998.
"Beating the Limitations of Camera–Monitor Mediated Telepresence with Extra Eyes", by Kimiya Yamaashi, Jermy R. Cooperstock, Tracy Narine and William Buxton, 1996.

* cited by examiner

Primary Examiner—Matthew Luu
(74) Attorney, Agent, or Firm—Pennie & Edmonds LLP

(57) ABSTRACT

An image is displayed using anamorphic video. A first portion of an image is displayed on a display at a first scale. At least one second portion of the image is displayed on the display. The at least one second portion is adjacent the first portion of the image. The second portion is displayed at a second scale higher than the first scale.

47 Claims, 23 Drawing Sheets

Anamorphic Video - Visually Abrupt Change

Top View of Camera Layout

Top View of Camera Layout

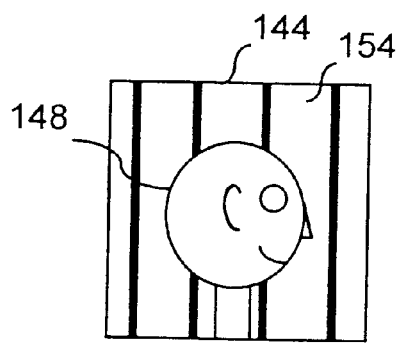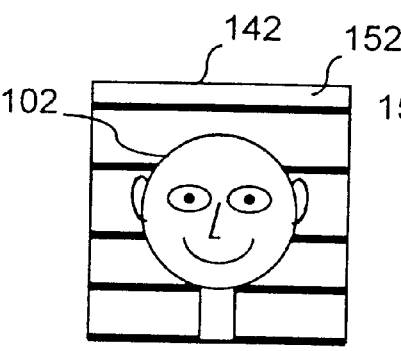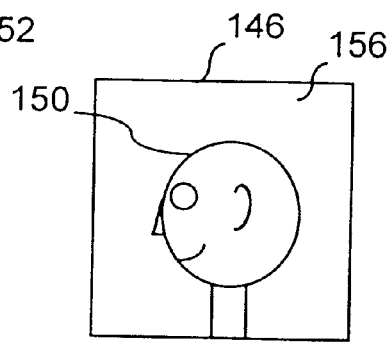
FIG. 5B     FIG. 5A     FIG. 5C

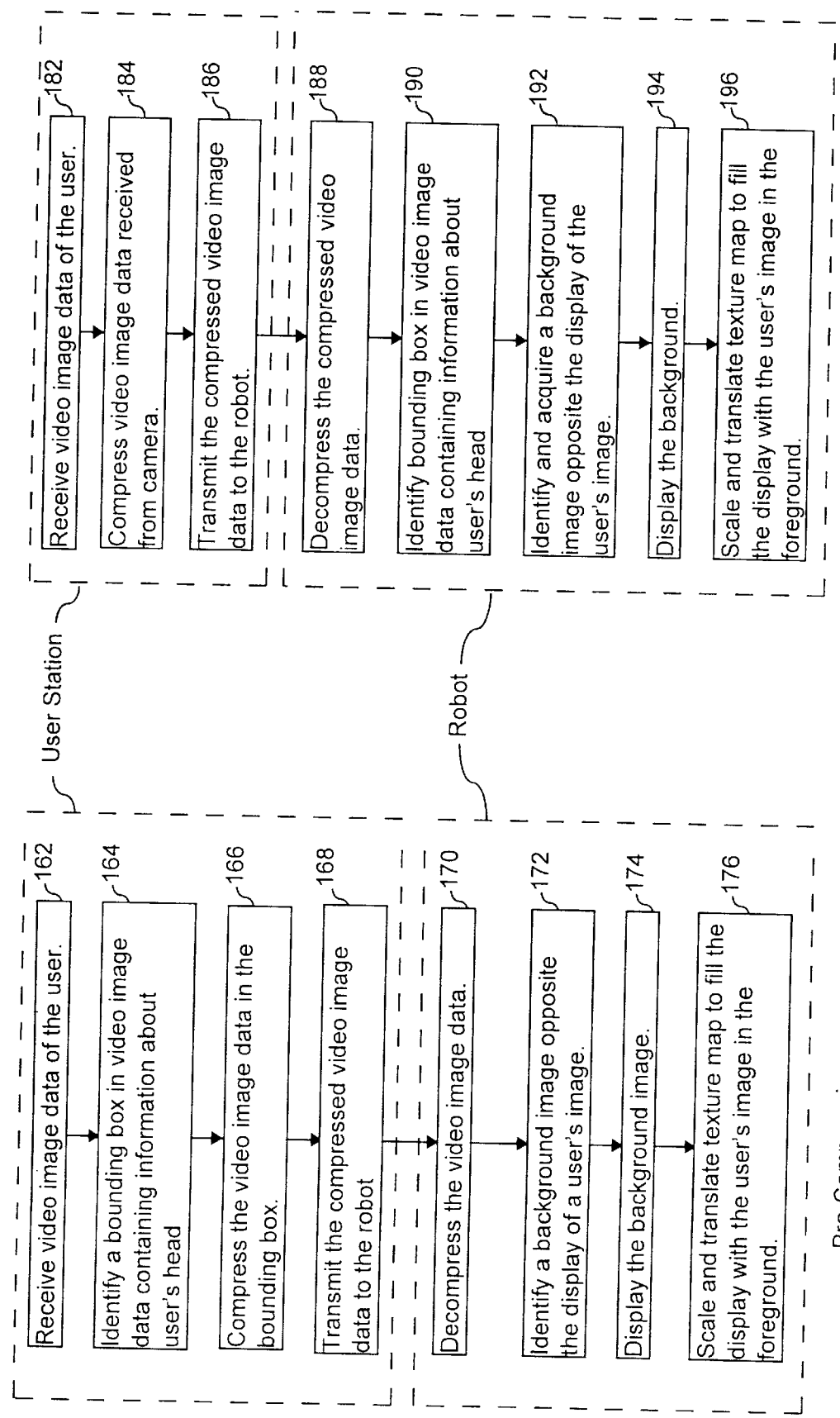

Foveal Video

Anamorphic Video - Visually Abrupt Change

Anamorphic Video - Visually Abrupt Change

Anamorphic Video - Abrupt Grading

Anamorphic Video - Smooth Grading

Two-dimensional Graduated Anamorphic Video

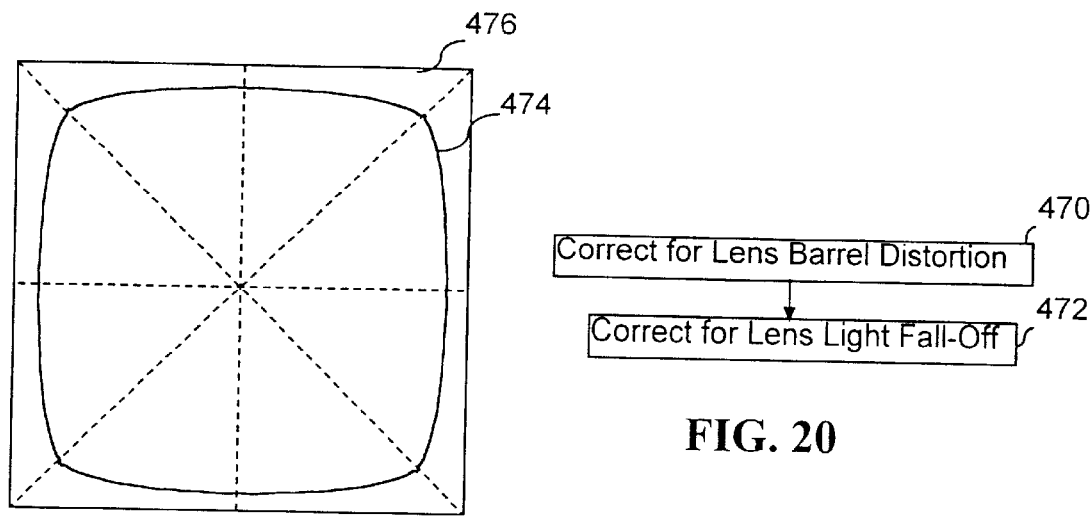
FIG. 20
FIG. 21
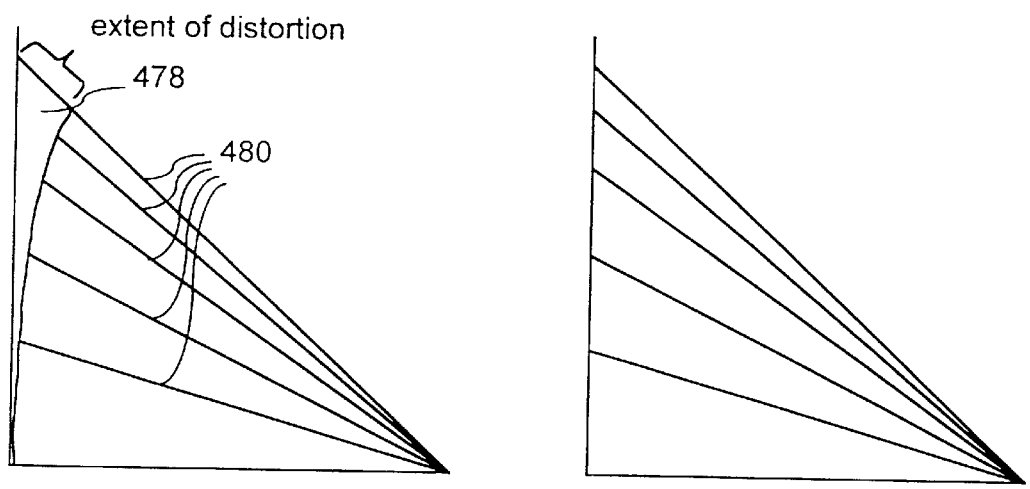
FIG. 22  FIG. 23

Lens Intensity Map (Light Falloff)

Opacity Map for Texture Technique

SYSTEM AND METHOD FOR DISPLAY IMAGES USING ANAMORPHIC VIDEO

The present invention relates generally to computer graphics, and particularly to a system and method for displaying images using anamorphic video.

BACKGROUND OF THE INVENTION

In robotic telepresence, a remotely controlled robot simulates the presence of a user. The overall experience for the user and the people interacting with the robotic telepresence device is similar to videoconferencing, except that the user has a freedom of motion and control over the robot and video input that is not present in traditional videoconferencing. The robot platform typically includes a camera, a display device, a motorized platform that includes batteries, a control computer, and a wireless computer network connection. An image of the user is displayed on the robotic telepresence device's display. This image is captured by a camera at the user's location.

In one prior art approach, a robotic device is built on a remote controlled car. However, driving the car remotely is considerably more difficult than personally walking through the same area. The robotic device uses a single small camera with a relatively small field of view and low resolution. This device shares problems with videoconferencing in that the user has "tunnel vision." The user is not provided with a peripheral view of the environment as compared to human peripheral vision. In addition, the central resolution of the remote camera is much lower than that of the human eye, which makes it difficult to remotely read anything other than very large text.

Therefore, there is a need for a method and apparatus that provides a large field of view which can be used in a robotic telepresence device. There is also a need for a method and apparatus to improve the resolution of the received images.

SUMMARY OF THE INVENTION

A method displays an image using a novel technique called anamorphic video. In anamorphic video, a first portion of an image is displayed on a display at a first scale. At least one second portion of the image is displayed on the display. The at least one second portion is adjacent the first portion. The at least one second side portion is displayed at a second scale higher than the first scale.

In one aspect of the invention, first portion of the image is a center portion. The at least one second side portion is a side portion of the image and includes the second side portion and a third side portion. The second and third side portions are displayed adjacent to the first portion.

In another aspect of the invention, a computer system displays information using anamorphic video. In yet another aspect of the invention, a computer program product embodies the method of displaying an image using anamorphic video.

In yet another alternate aspect of the invention, a robotic telepresence system displays information received from a robot at a user station using anamorphic video.

By displaying an image using anamorphic video, a user station provides a peripheral view of the environment that meets or exceeds that of human peripheral vision. Alternately, the user station includes an immersion room that provides a peripheral view of the environment that meets or exceeds that of human peripheral vision. More particularly, the user station and immersion room are part of a robotic telepresence system.

BRIEF DESCRIPTION OF THE DRAWINGS

Additional objects and features of the invention will be more readily apparent from the following detailed description and appended claims when taken in conjunction with the drawings, in which:

FIG. 5A is diagram of the display of the robot of FIG. 2 in the conference room of FIG. 4 illustrating the display of a texture map of a front view of user's head onto a front display.

FIG. 5B is diagram of the display of the robot of FIG. 2 in the conference room of FIG. 4 illustrating the display of the texture map of the user's side profile onto a side display.

FIG. 5C is diagram of the display of the robot of FIG. 2 in the conference room of FIG. 4 illustrating the display of the texture map of the user's other side profile onto another side display.

FIG. 6 is a flowchart illustrating a method of tracking the user's head using a pre-compression technique.

FIG. 7 is a flowchart illustrating a method of tracking the user's head using a post-compression technique.

FIG. 20 is a flowchart for additional digital imaging to be applied to received images to correct for lens barrel distortion and lens light falloff.

FIG. 21 illustrates the effect of lens barrel distortion.

FIG. 22 illustrates the extent of the lens barrel distortion.

FIG. 23 is an image corrected for lens barrel distortion.

DESCRIPTION OF THE PREFERRED EMBODIMENTS

Figure 1:
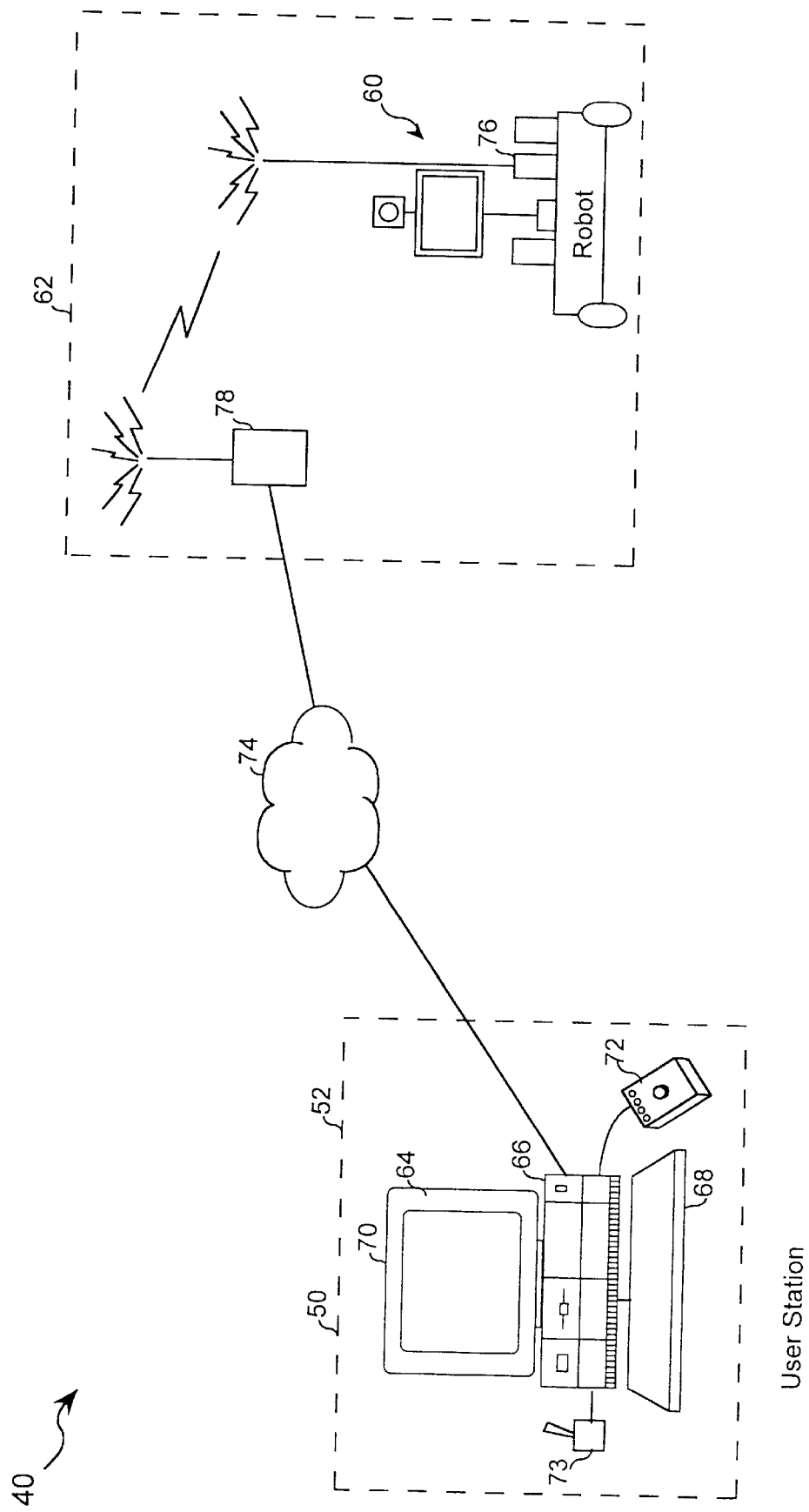
FIG. 1 is a diagram of a robotic telepresence system of the present invention.

In FIG. 1, a robotic telepresence system 40 has a user station 50 at a first geographic location 52 and a robot 60 at a second geographic location 62. The user station 50 is responsive to a user and communicates information to and receives information from the user. The robot 60 is responsive to commands from the user station 50 and provides a three dimensional representation of the user and audio from the user which is transmitted by the user station 50. The robot 60 also senses predetermined types of information and communicates the sensed information back to the user station 50. The user station 50 provides an image from a camera on the robot 60, as well as audio from the robot 60.

In the embodiment shown in FIG. 1, the user station 50 is implemented using a computer system 64. The computer system 64 has a central processing unit (CPU) 66, keyboard 68, display 70, mouse 72 and joystick 73. The computer system 64 has a communications interface to a communications medium 74. In one embodiment, the communications medium 74 is a public network such as the Internet. Alternately, the communications medium 74 includes a private network, or a combination of public and private networks.

The robot 60 is coupled to the communications medium 74 via a wireless transmitter/receiver 76 on the robot 60 and at least one corresponding wireless transmitter/receiver base station 78 that is placed sufficiently near the robot 60 to transmit and receive signals as the robot 60 moves.

Figure 2:
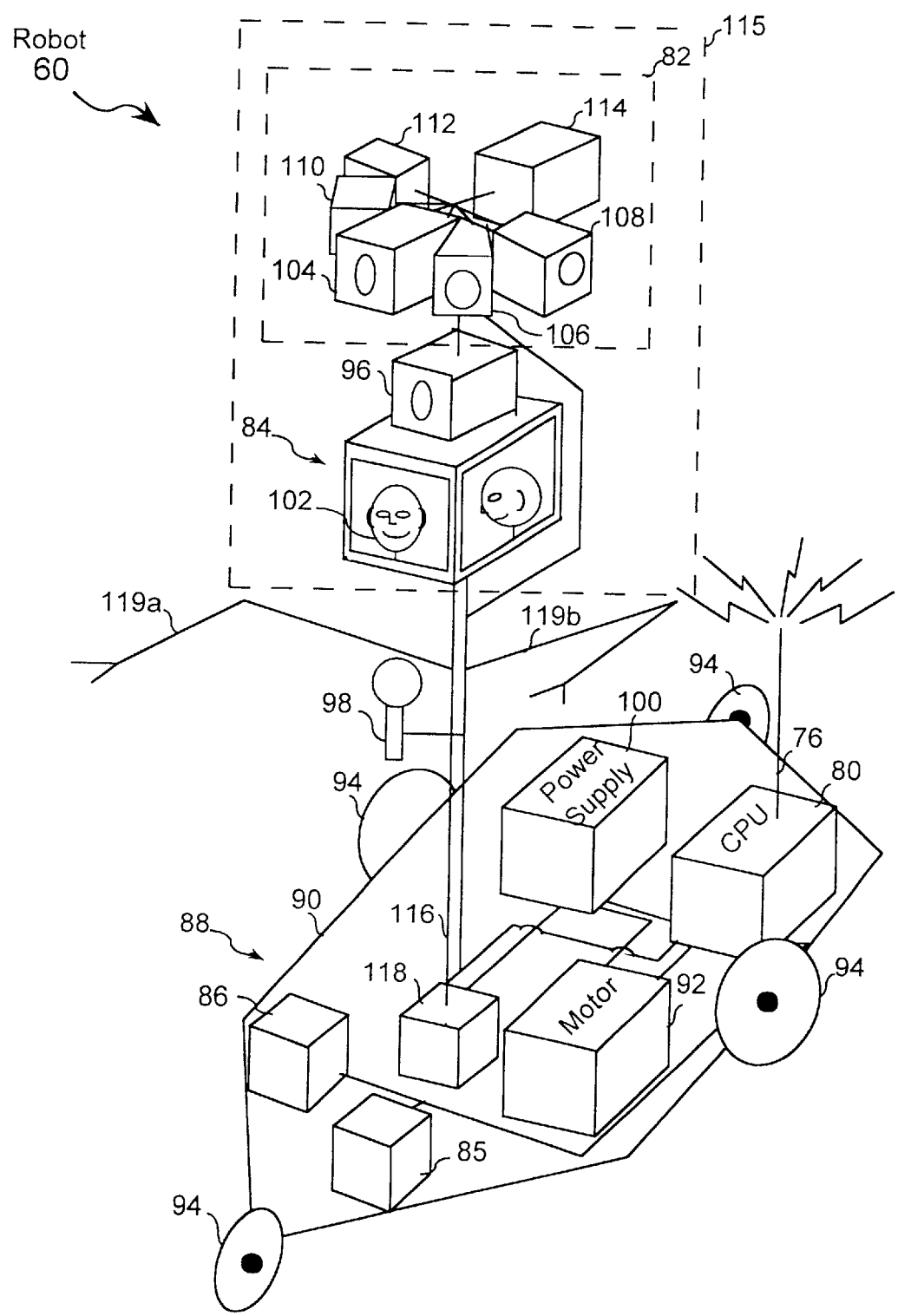
FIG. 2 is perspective view of one embodiment of the robot of FIG. 1.

As shown in FIG. 2, on the robot 60, a control computer (CPU) 80 is coupled to and controls a camera array 82, a display 84, at least one distance sensor 85, an accelerometer 86, the wireless computer transmitter/receiver 76, and a motorized assembly 88. The motorized assembly 88 includes a platform 90 with a motor 92 that is coupled to wheels 94. The control computer 80 is also coupled to and controls speaker 96 and microphone 98. The platform 90 supports a power supply 100 including batteries for supplying power to the control computer 80, the motor 92, the display 84 and the camera array 82.

An image of the user 102 is displayed on the robot's display 84. The user's image is captured by one or more cameras at the user's location.

The robot 60 has at least one first sensor 104 to sense information at a first predetermined high resolution level, and at least one second sensor 106–114 to sense information at a predetermined low resolution level. In particular, in the camera array 82, at least one high resolution camera 104 senses video information at a first predetermined high resolution level, and at least one low resolution camera 106, 108, 110, 112, 114 senses video information at a predetermined low resolution level. For example, in a preferred embodiment, the high resolution image has a pixel density that is at least two times the pixel density of the low resolution images. Alternately, at the high resolution level, one pixel represents an area of six arc-minutes by six arc-minutes. In other words, an area of 1° by 1° is represented by 100 pixels. At the low resolution level, one pixel represents an area of twelve arc-minutes by twelve arc-minutes. In other words, an area of 1° by 1° is represented by 25 pixels. All or a portion of the video images from all or a subset of the cameras 104–114 is transmitted from the robot 60 to the user station 50 (FIG. 1). The high resolution camera 104 is physically aligned with the motorized assembly 88 in a forward direction of travel. The robot 60 transmits high resolution images to the user in a direction of travel.

The robot 60 has a "head" 115 that includes the camera array 82 and the display 84. In an alternate embodiment, the head 115 with the camera array 82 is mounted on a shaft 116 which is coupled to a motor 118. In response to user commands to turn the camera array 82, the control computer 80 activates the motor 118 which turns the shaft 116 with the camera array 82. In this way the user is provided with a way of using the robot's high resolution camera 104 to look around. For example, if the robot 60 were traveling down a hall, the high resolution camera could be looking at one side of the hall to allow the user to read office numbers ninety degrees to the direction of travel. The head 115 with the cameras 104–114 may also be tilted up and down to aid in viewing objects above or below the robot. In addition, when the head 115 moves, the display 84 also moves and enhances the sense of presence of the user at the remote location.

The distance sensor 85 is an ultrasonic device that sends signals indicating the distance of the robot 60 from objects. The accelerometer 86 provides signals indicative of motion of the robot caused by increasing or decreasing speed, turning left or right, or even by vibrations from a bumpy surface.

The robot 60 also has right and left arms 119a and 119b, respectively, disposed below the camera array 82 that are also coupled to the CPU 80. The arms 119a, 119b are positioned such that the arms 119a, 119b do not block the view from the cameras of the camera array 82. To prevent injury to people, the robot arms 119a, 119b are breakable. However, the arms 119a, 119b are sufficiently strong to press an elevator button or to press the handicap bar on a door.

Figure 3A:
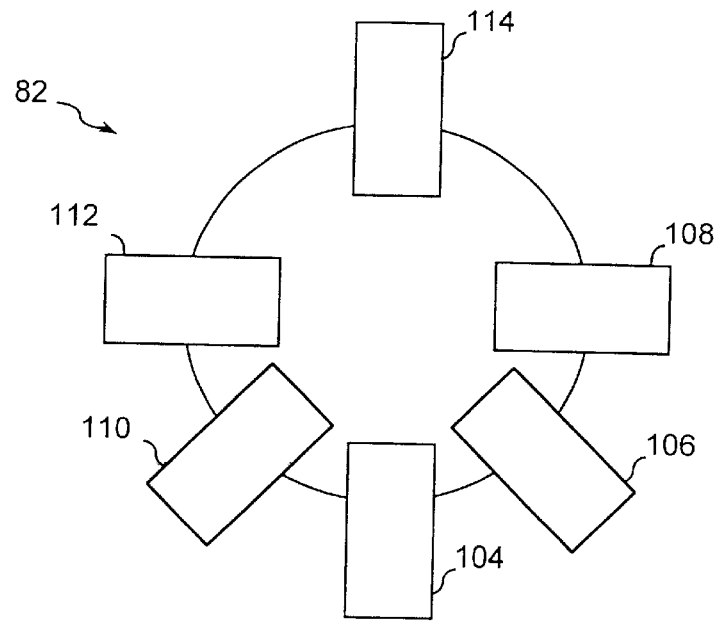
FIG. 3A is a top view of the camera arrangement on the robot of FIG. 2.

In FIG. 3A, in the camera array 82, the high resolution camera 104 is opposite a low resolution rear camera 114. In a preferred embodiment, the high resolution camera 104 uses a telephoto lens, while the low resolution cameras 106–114 use wide angle lenses. As will be described in detail below, the low resolution rear camera 114 provides background information for the robot's display. In an alternate embodiment, the video image from the low resolution camera 114 is transmitted to the user station so the user can see events outside the normal human visual range.

The two low resolution side cameras 112 and 108 are substantially perpendicular to cameras 104 and 114 and provide additional visual information. The two additional low resolution cameras 106,110 are disposed between the high resolution camera 104 and the side cameras 108, 112, respectively. Preferably, the low resolution cameras 106–114 provide a wide-angle or peripheral view of the surroundings to the user.

Figure 3B:
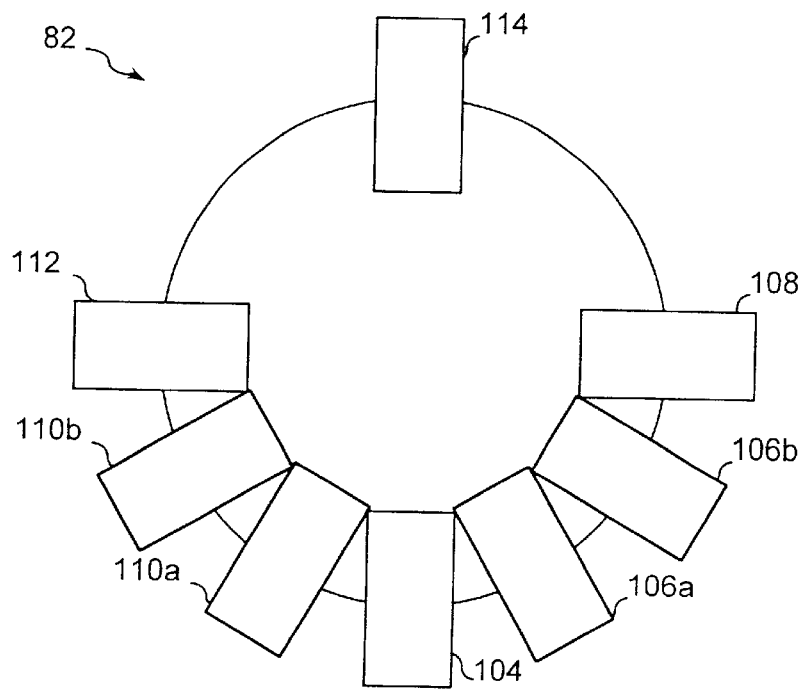
FIG. 3B is a top view of an alternate camera arrangement used with the robot of FIG. 2.

In FIG. 3B, an alternate embodiment of the camera array 82 is the same as shown in FIG. 3A except that two pairs of low resolution cameras 106a and 106b, 110a and 110b, are used in place of cameras 106 and 110, respectively. The additional low resolution cameras 106a, 106b, 110a, 110b may be used to increase the resolution of the low resolution images or to increase the field of view.

Although the invention will be described with respect to the camera array 82 of FIG. 3A, the camera array of FIG. 3B is used in an alternate embodiment.

Figure 4:
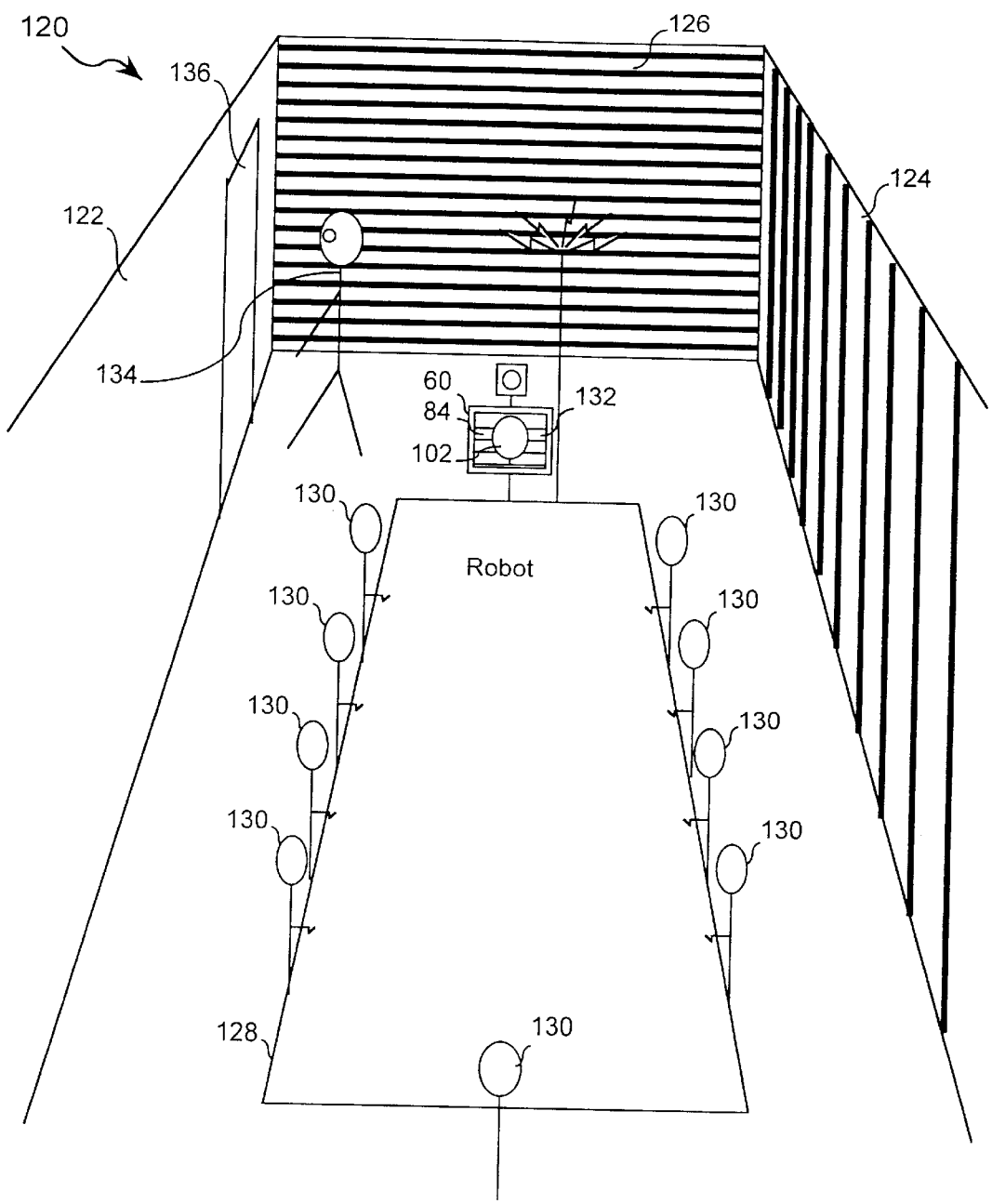
FIG. 4 is a diagram illustrating the use of the robot of FIG. 2 in a conference room with the overlay of the user's head on a background image.

As shown in FIG. 4, the robot 60 provides a telepresence for a user at a remote user station at a meeting in a conference room 120. The conference room 120 is decorated with a plain side wall 122 opposite a vertically striped side wall 124. At the end of the conference room 120, the wall 126 behind the robot 60 is decorated with horizontal stripes. The robot 60 is chairing the meeting at one end of the table 128. A group of conferees 130 are sitting at the sides and end of the table 128. Note that the display 84 of the robot 60 displays the user's image 102 in front of the image 132 of a portion of the back wall 126. Therefore, the three dimensional display with the image of the user's head in front of the local background enhances the user's presence in the meeting because the user appears to be in the room with the conferees 130.

Note that one of the conferees 134 is leaving the meeting by walking behind the robot to the door 128. Because the robot 60 has a camera array 82 with side and rear cameras 106–114, the video information transmitted to the remote user will include the image of the conferee 134 leaving the meeting. In this way, the robot 60 will keep the remote user informed of events in the room, just like the user was in the conference room 120.

FIGS. 5A–5C illustrate the robot's display 84 with a texture map of front and profile views of the user's head onto the display 84. A texture map is the application of a bit map onto a three dimensional shape to give the impression of perspective and different surfaces. Note that the robot 60 provides a three dimensional representation of the user. The robot's display 84 has three panels 142, 144, 146 that display the front view 102, profile view 148 and other profile view 150, respectively, of the user. In FIG. 5A, the front view 102 of the user is displayed as a texture map over an image 152 of the wall 126 (FIG. 4) behind the robot 60 (FIG. 4). In FIG. 5B, the profile view 148 of the user is displayed as a texture map over an image 154 of the wall 124 (FIG. 4) at one side of the robot 60 (FIG. 4). In FIG. 5C, the other profile view 150 of the user is displayed as a texture map over an image 156 of the wall 126 (FIG. 4) at the other side of the robot 60 (FIG. 4).

In FIG. 6, a flowchart illustrates a method of transmitting and displaying video information of the user's head using a pre-compression technique. Steps 162–168 form a pre-compression_gather_user_image procedure which is executed by the CPU at the user station. Steps 170–176 form a pre-compression_display_user_image procedure which is executed by the CPU on the robot. In step 162, at least one video image of the user is received. A chroma-key blue or green background is behind the user to make the user's image easier to identify from the background. In step 164, a bounding box in the video image containing information about the user's head is identified. A bounding box is the smallest rectangular box surrounding an object that is aligned to the x and y axes of the display. In step 166, the video image data in the bounding box is compressed. In step 168, the user station transmits the compressed video image data in the bounding box to the robot. The pre-compression_gather_user_image procedure and pre-compression_display_user_image procedure is executed for the display of the front and profile views of the user.

The pre-compression_display_user_image procedure, implementing steps 170–176, is executed at the robot. In step 170, the video image data is received and decompressed. In step 172, the robot identifies a background image substantially opposite the display of the user's image. In step 174, the background image is displayed on the robot. In an alternate embodiment, the background image is warped to match a viewer's perspective. In this description, warped means a geometric transformation of an image. In this case, warping is used to render the background image from a different perspective. In step 176, the robot scales and translates a texture map of the user's head to fill the display with the user's image in the foreground.

In FIG. 7, a flowchart illustrates a method of transmitting and displaying video information of the user's head using a post-compression technique. Steps 182–186 form a post-compression_gather_user_image procedure that is executed by the CPU at the user station. In step 182, a video image of the user is received. As described above, the user is in front of a chroma key blue or green background. In step 184, the video image data received from the camera is compressed. Unlike the method of FIG. 6, the user station does not identify the bounding box with the user's image. In step 186, the compressed video image data is transmitted to the robot.

At the robot, steps 188-196 form a post-compression_display_user_image procedure that is executed by the CPU at the robot. In step 188, the video image data is received and decompressed. In step 190, a bounding box in the video image data that contains information about the user's head is identified. In step 192, a background image opposite the display of the user's image is identified and acquired. In step 194, the background image is displayed. In step 196, the robot scales and translates a texture map of the user's head to fill the display with the user's image in the foreground.

Foveal Video

Figure 8A:
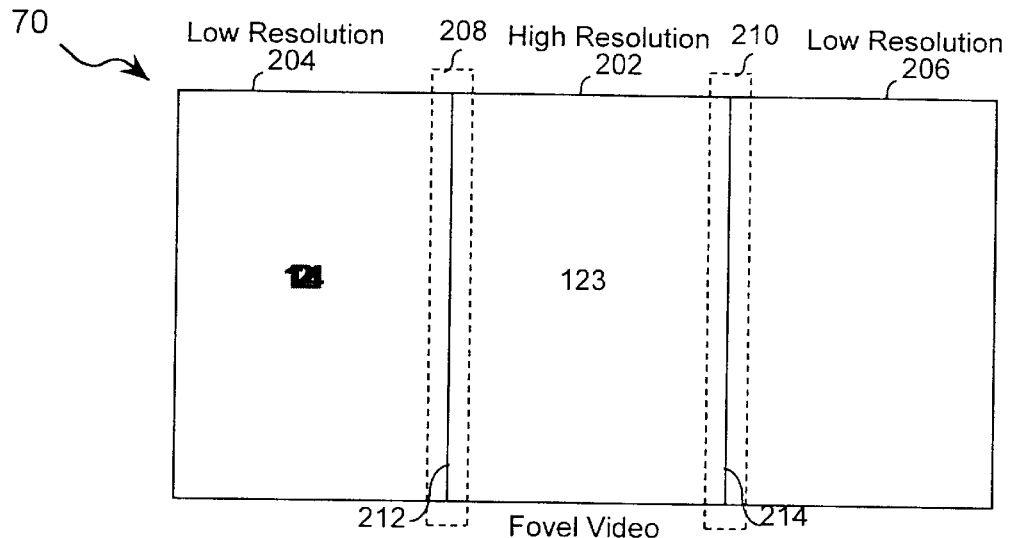
FIG. 8A is a diagram of a display using foveal video.

In a particularly significant aspect of the invention shown in FIG. 8A, the user at the user station is provided with foveal video. Foveal video simulates the natural view seen by the human eye. In the human eye, light receptors are not uniformly distributed but concentrated in a portion of the eye called the fovea. The fovea is the part of the eye that is used when we look directly at an object point. The large number of light receptors in the fovea allow humans to see details when looking directly at objects. Although the light receptors outside the fovea do not provide as high image definition, the light receptors outside the fovea do provide the function of detecting motion and differences in the amount of light, thereby signaling viewers to change their gaze in an appropriate direction for a more detailed examination of the surroundings using the fovea.

As shown in FIG. 8A, in foveal video, a high resolution image 202 and one or more low resolution images 204, 206 are combined to produce a single image, partially high resolution, partially low resolution, on the display 70 at the user station. The high resolution image 202 at least partially overlaps at least one of the low resolution images 204, 206. Dashed lines 208, 210 illustrate the overlap regions. In this way, the resolution of a particular area of interest 202 in the received image is increased while providing the user with a peripheral low resolution view 204, 206 of the surrounding area. In a preferred embodiment, the high resolution image 202 is combined with two low resolution images 204, 206.

The camera array 82 of FIGS. 3A and 3B provides the high and low resolution images for foveal video. The high resolution camera 104 provides the video information for the high resolution image 202, while the low resolution cameras 106, 110, provide the video information for the low resolution images 204, 206, respectively.

Foveal video is especially useful when the robot needs to "read" information, such as room numbers in a hallway. For example, the exemplary number "123" in the high resolution region 202 is much easier to read than the exemplary number "124" in the low resolution region 204.

In particular, FIG. 8A illustrates a high resolution image 202 substantially centered between the two low resolution images 204, 206. Although FIG. 8A shows region boundaries 212, 214 in the overlap regions 208, 210, in practice, a single seamless image without lines is generated and displayed. The overlap regions 208, 210 are formed because the video image data from the high and low resolution cameras have overlapping views. To capture the entire view, the cameras on the robot are aligned to provide a predetermined amount of overlap. Each camera captures one aspect of the image and the digital information from each camera is transmitted separately. When the digital image information is to be displayed, the computer system at the user station executes a foveal_video procedure that uses the digital information in the overlap region to align and blend the images.

Figure 8B:
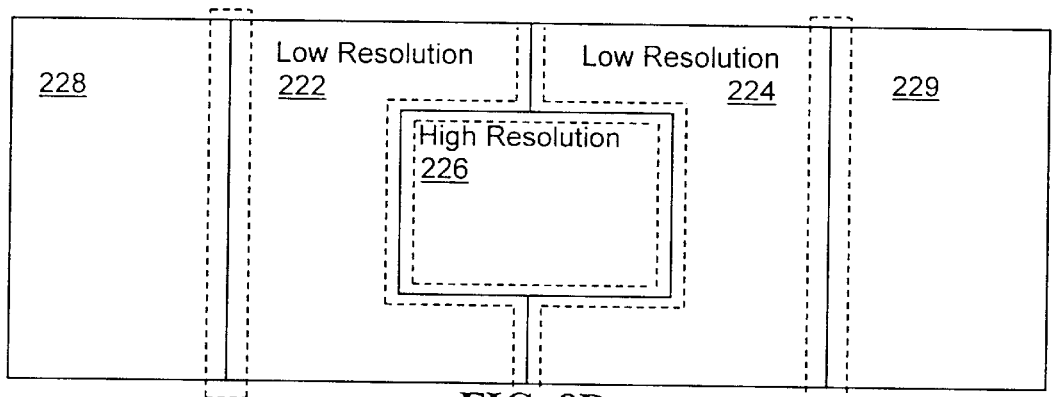
FIG. 8B is a diagram of a display using foveal video in two dimensions.

FIG. 8B illustrates a preferred implementation of foveal video. In this embodiment, two low resolution images 222, 224 are blended together in the center of a display. A portion of the low resolution images 222, 224 is "cut-out" leaving a small overlap region, shown by the dashed lines, that overlaps the high resolution image 226. The high resolution image 226 is aligned and blended with the low resolution images 222, 224 in the overlap regions. The low resolution images 228, 229 are aligned and blended with low resolution images 222, 224, respectively.

Preferably, the high resolution image 226 is vertically positioned in about the upper two-thirds portion of the display 70 and horizontally positioned in substantially the center of the display surrounded by the low resolution images.

The human fovea has a field of view of approximately three degrees, while human peripheral vision has a field of view of approximately 150°. In the invention, the field of view of the high resolution area is typically twenty-five to thirty-five degrees. Because the fovea of the human eye covers about three degrees, using the present invention, a user may not need to turn their head as much to read detailed information. However, in the high resolution portion, the present invention does not show as much detail as the human eye: the resolution of the human fovea is about one arc minute while the invention provides about six arc minutes in the high resolution portion.

Figure 8C:
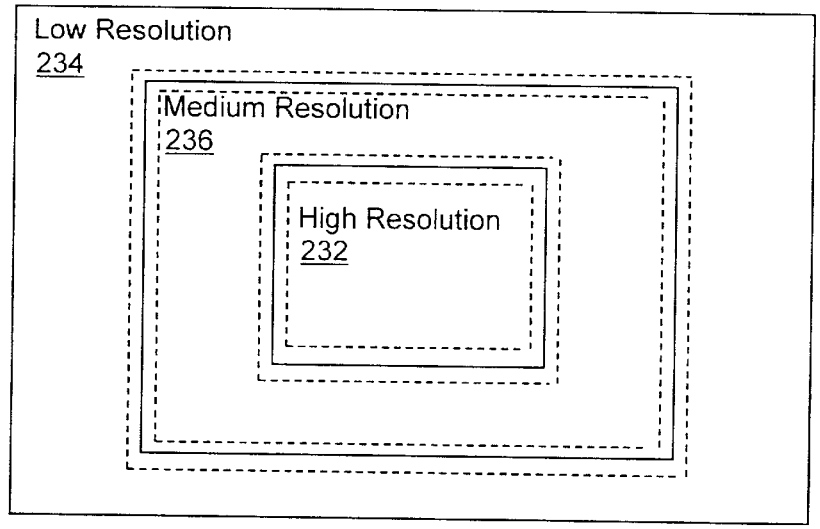
FIG. 8C is a diagram of a display using multi-resolution foveal video.

FIG. 8C illustrates multiple levels of foveal video that is used with a low, medium and high resolution cameras focused on the same object. In one embodiment, a sixteen millimeter (mm) telephoto lens, an eight mm telephoto lens and a four mm wide angle lens are all focused on the same object. The resulting images are displayed in a series of concentric rectangles. The edges of the rectangles are aligned and blended to provide a seamless image. For example, the medium resolution image has a pixel density that is at least two times the pixel density of the low resolution images; and the high resolution image has a pixel density at least two times the pixel density of the medium resolution image. In other words, the pixel density increases by a factor of two at each level of foveal video.

Figure 9:
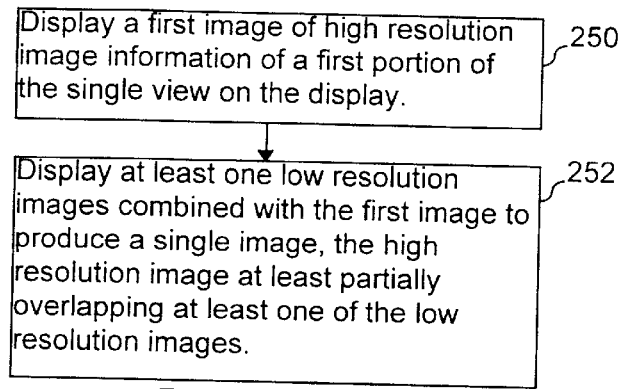
FIG. 9 is a flowchart of a general method of displaying images using foveal video in a seamless display.

FIG. 9 is a flowchart of a method of displaying images using foveal video in a seamless display that is implemented in the foveal_video procedure. In step 250, a first image of high resolution image information is displayed in a first portion of the single view on the display. In step 252, at least one low resolution image is combined with the first image to produce a single image on the display. The high resolution image at least partially overlaps at least one low resolution image.

Figure 10:
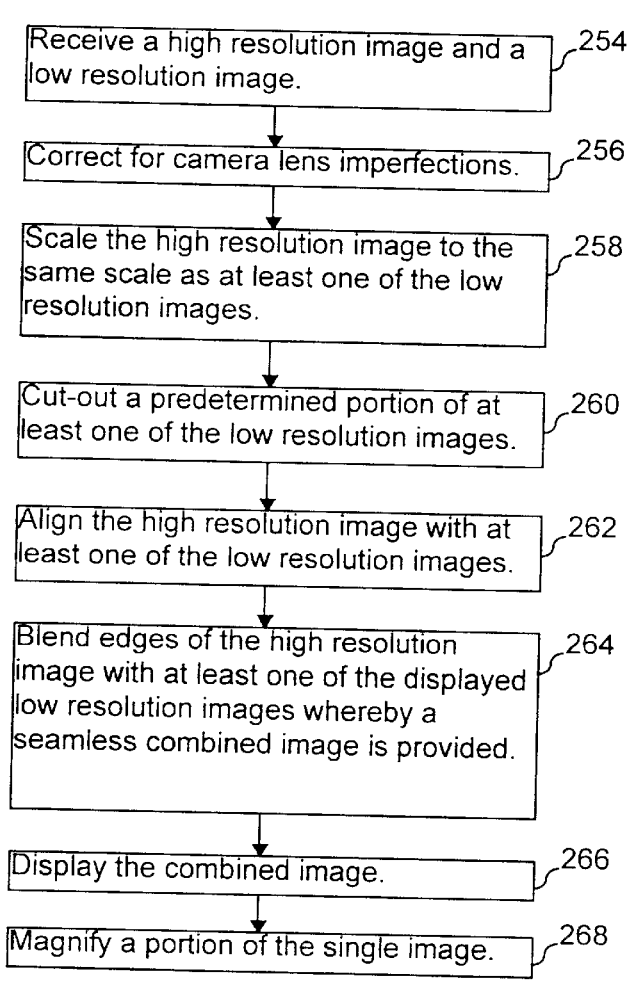
FIG. 10 is a flowchart of a detailed method of displaying images using foveal video in a seamless display.

FIG. 10 is a detailed flowchart of the method of FIG. 9. In step 254, a high resolution image and at least one low resolution image are received. In step 256, the high resolution and low resolution images are corrected for lens imperfections which will be discussed in detail below. In step 258, the high resolution image is scaled to the same scale as at least one of the low resolution images. In step 260, a predetermined portion of at least one of the low resolution images that corresponds to the high resolution image is cut out to leave an overlapping edge region for blending. In this way, the detailed image information in the high resolution image is preserved by not blending it with the low resolution image. In step 262, the high resolution image is aligned with at least one of the low resolution images. In step 264, the edges of the high resolution image are blended with at least one of the displayed low resolution images to provide a seamless combined image. In step 266, the combined seamless image is displayed. In optional step 268, a portion of the single image is magnified. In this step, the user can select the portion of the image to magnify and the amount of magnification.

Figure 11:
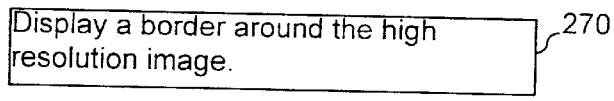
FIG. 11 is a flowchart of an alternate method of displaying images using foveal video with a border identifying the high resolution image that is used with the method of FIG. 9.

FIG. 11 illustrates an alternate method of displaying images using foveal video that displays a border around the high resolution image. Steps 254–264 are executed as described above and are not shown. After step 264 is executed, in step 270, a border that surrounds the high resolution image in the seamless combined image is generated. Then, step 266 displays the combined image with the border. In an alternate embodiment, the blending of step 264 is not performed because the overlapping region is covered with the border.

Figure 12:
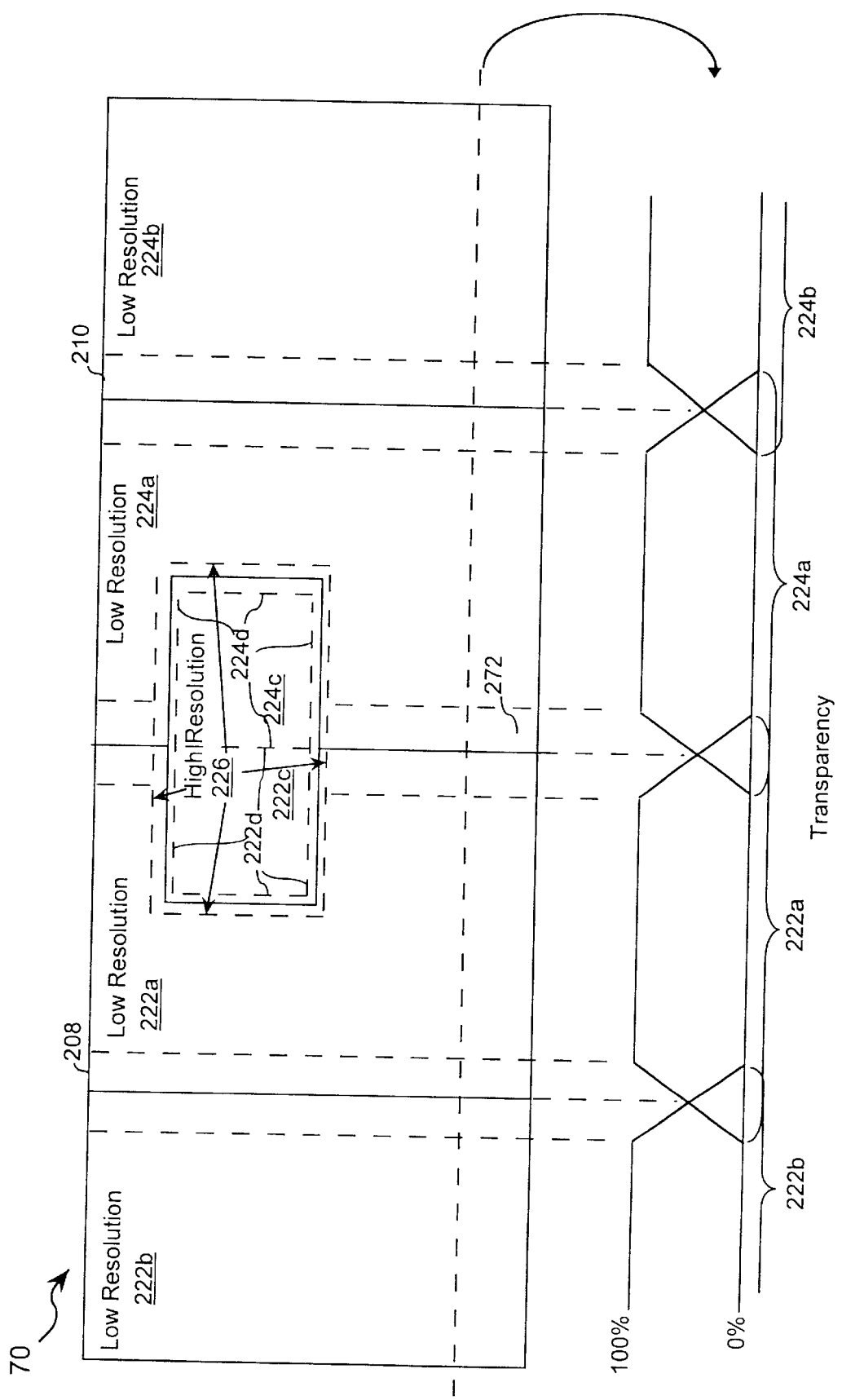
FIG. 12 is a diagram of a display using foveal video with an intensity map for a section of the display.

FIG. 12 illustrates an intensity map used for blending images of a display 70. In this display 70, low resolution images 222a and 222b have an overlap region 208. Low resolution images 224a and 224b also have an overlap region 210. Another overlap region 272 is formed between low resolution regions 222a and 224a. An intensity map for blending the images in the overlap regions is shown for cut line 274. If the intensity values for each pixel in the overlap regions were added, the overlap regions would appear brighter than the non-overlapping regions on the display. The intensity map shows how the intensity values from each image are weighted before they are summed. For example, for low resolution region 222b, one hundred percent of the intensity value for the pixels of region 222b is used until the overlap region 208 is reached. In the overlap region, the percentage of the intensity value from region 222b is linearly reduced until the percentage reaches zero at the other end of the overlap region 208. Simultaneously, the percentage of the intensity values from region 222a linearly increases from zero to one hundred percent in the overlap region. The blending can be represented by the formula:

$$I_A * \text{transparency factor } A + I_B * \text{transparency factor } B$$

where:

$I_A$ is the pixel intensity from region A (for example, region 222b), $I_B$ is the pixel intensity from region B (for example, region 222a), and the transparency factors vary linearly from one to zero, and from zero to one, in the overlap region.

A transparency factor of one hundred percent completely overlays one image on another, while a transparency factor of zero eliminates a region from being displayed. At the center of the overlap region, a transparency factor of fifty percent is applied to each image. Transparency factor B is equal to one minus the value of transparency factor A.

In the display 70 of FIG. 12, the high resolution region 226 overlays portions of the low resolution regions 222a, 224a and would appear to be a complete overlap region. In one implementation, the high and low resolution cameras are precisely aligned and their corresponding images will be similarly aligned. To display only the high resolution image in the overlapping region of the high and low resolution images, predetermined "cut-out" regions 222c, 224c are identified as shown by dashed lines 222d and 224d. The low resolution image data in the "cut-out" regions 222c, 224c is not blended with the overlapping high resolution image data in the "cut-out" regions 222c, 224c thereby preserving and displaying the high resolution image information. For alignment and blending, a border region of the high and low resolution regions overlaps at the edges of the "cut-out" regions 222c, 224c and the high resolution region 226. The edges of the high resolution image are aligned to and blended with the edges of the "cut-out" regions in the overlap region; while the high resolution image information is displayed inside the "cut-out" region to provide a seamless display.

Anamorphic Video

Using peripheral vision, the human eye can detect movement and distinguish between light and dark even at seventy-five degrees with respect to the eye's optic axis. A user at a user station does not have the benefit of their peripheral vision. Anamorphic video provides this peripheral visual information to the user.

In addition, if all the video information from the camera array were displayed on a typical display for a computer system such as a liquid crystal display (LCD) or a cathode ray tube (CRT), the amount of video information displayed would need to be greatly scaled down to fit on the display and details would be lost. In addition, only certain portions of the display may be of particular interest. Anamorphic video provides users with a way to have detailed information in a particular region of interest while expanding their field of view to include all or a portion of the information from the cameras of the camera array.

Figure 13:
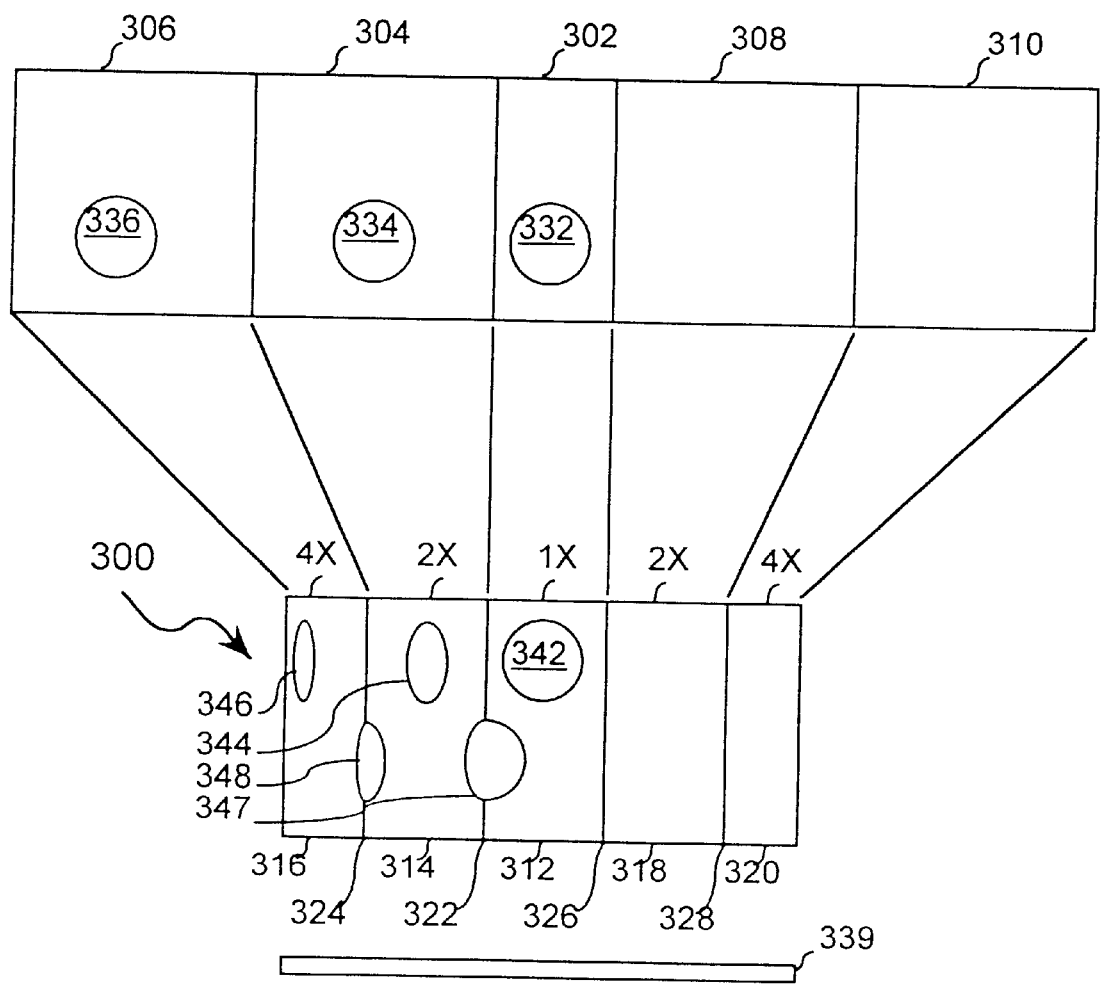
FIG. 13 is a diagram illustrating the mapping of a set of images into a display using abrupt anamorphic video.

In FIG. 13, five bands or portions of an image are mapped to a display 300. All five bands can be from one camera with a wide angle lens or from multiple cameras. Box 302 represents a first band of the image. In one embodiment, the first band of the image is a high resolution image. Boxes 304–310 represent other portions of the image. In an alternate embodiment, these other portions of the image are from at least one wide angle low resolution camera. Note that the first band has a narrower horizontal field of view than the other bands. The image information for the first band is mapped to region 312 of the display 300. The image information for the adjacent band 304 is displayed in region 314 of the display 300 and the image information for the next adjacent band 306 is displayed in region 316 of the display 300.

In the exemplary display 300, regions 312, 314 and 318 have the same width, while regions 316 and 320 have half the width of regions 312, 314 and 318. The image shown in region 302 is considered to have the same ratio of width to height as region 312 of the display; and therefore has a scale of "1×" between the image information in band 302 and the region 312 of the display. However, band 304 is twice as wide as band 302; therefore, band 304 is scaled, relative to region 312, to display all the image information in region 314. In this example, the image information in band 304 is horizontally scaled by a factor of two, as indicated by the designation "2×," for display. Region 316 on the display 300 is half the size of region 314; therefore, the image information in band 306 is scaled by a factor of four, as indicated by the designation "4×," for display. In one embodiment, boundaries between regions are shown as lines 322, 324, 326 and 328. In a preferred implementation, the boundary lines are not displayed. As described above for foveal video, the images 302–310 may have overlapping regions which are aligned and blended together. In addition, as will described below, the bands may be digitally corrected for lens imperfections and camera artifacts. If multiple cameras are used to generate each or subsets of the bands, the bands may be digitally aligned, blended, scaled and displayed using anamorphic video.

Circles are used to depict the result of the anamorphic video scaling described above. Each of the views 302, 304, 306 from the cameras has a circle 332, 334, 336, respectively.

In the display 300, region 312 has a horizontal scale of "1×" and the displayed circle 342 is round. In region 314 which has a horizontal scale of "2×," the horizontal dimension of the circle 334 is reduced by half and the displayed circle 344 appears as an oval. In region 316, the horizontal dimension of the circle 336 is reduced by a factor of four to display an oval 346. If a circle 347 is partially within a region 312 and the next adjacent region 314, note that at the boundary 322 the horizontal scaling abruptly changes so that the portion of the circle within region 312 is displayed at the "1×" scale, while the portion of the circle in region 314 is displayed at the "2×" scale. Similarly, the portion of a circle 348 in region 314 is displayed at the "2×" scale, while the portion of the circle 348 in region 316 is displayed at the "4×" scale.

On the display 300, the size of each region of the display can be adjusted by the user. For example, to adjust the size of the regions 312–320 on the display, the user uses a mouse to click on the boundary 322–328 to select and reposition the boundary 322–328. In another embodiment, the user is provided with a ruler bar 339 to set the size of each region 312–320.

Figure 14:
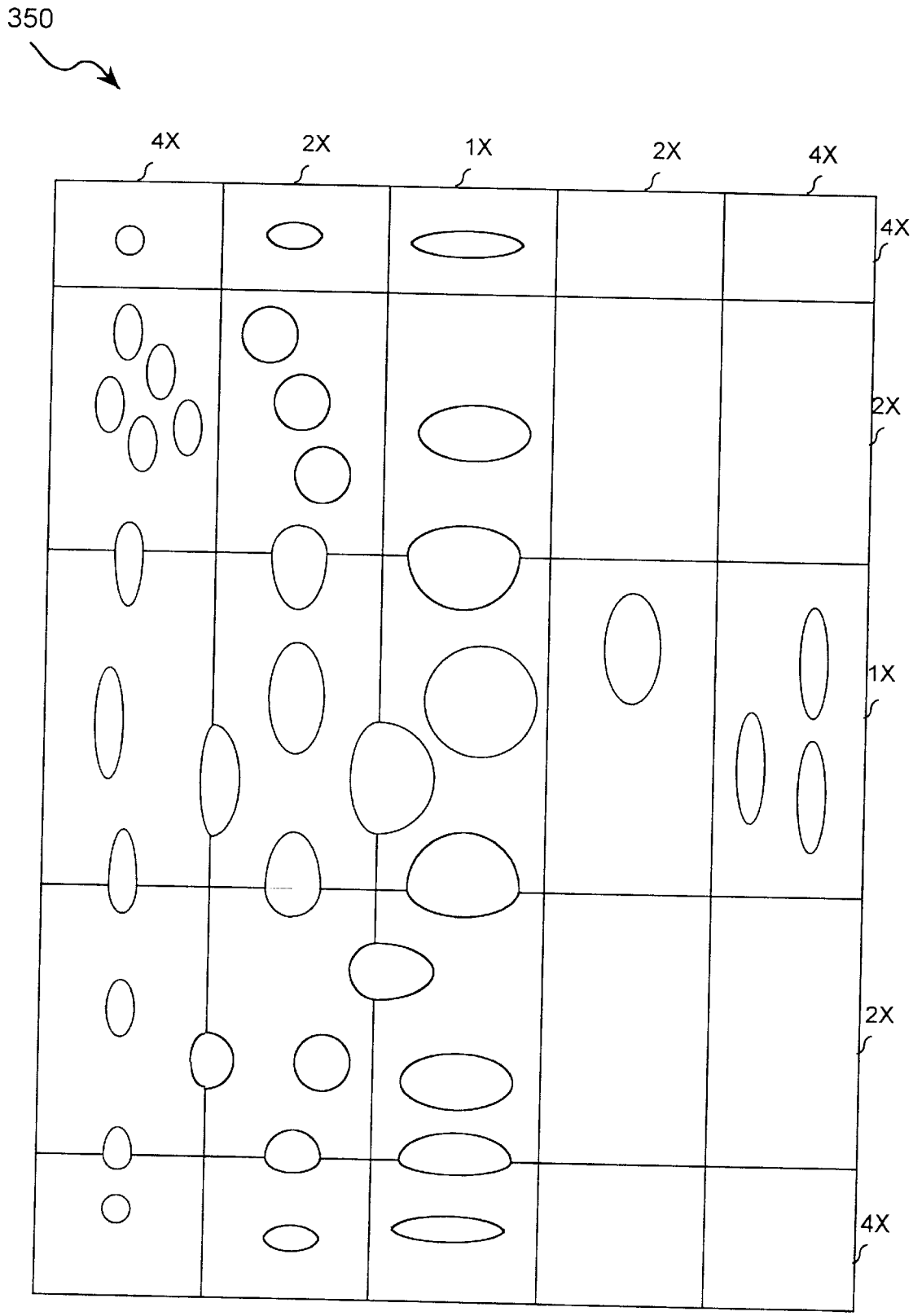
FIG. 14 is a diagram of a display using abrupt anamorphic video in two dimensions.

In FIG. 14, an exemplary display 350 illustrates visually abrupt anamorphic video in both the horizontal and vertical dimensions. Except for orientation, the image information in the vertical dimension is displayed in the same manner as the horizontal dimension described above. For example, the vertical dimension can be used to provide a view of at least a portion of the ceiling and floor, while the horizontal view can provide a sideways view of walls.

Figure 15:
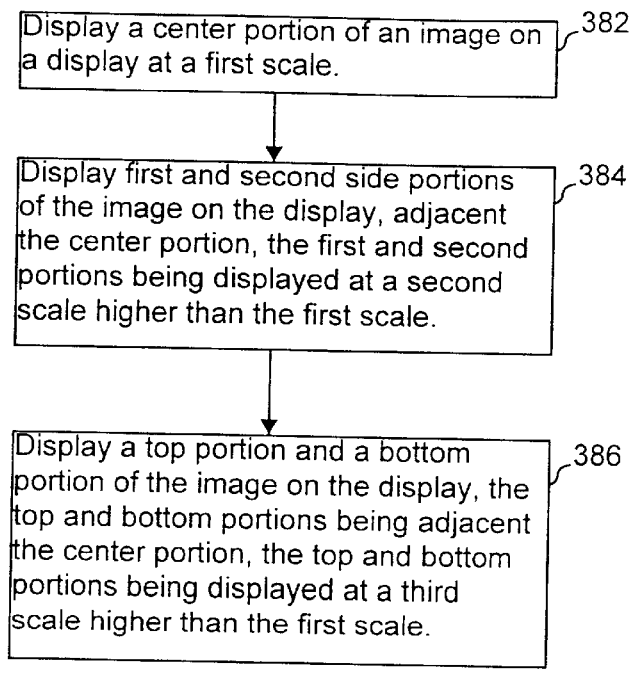
FIG. 15 is a flowchart of the method of displaying an image using visually abrupt anamorphic video.

FIG. 15 is a flowchart of the method of displaying an image using visually abrupt anamorphic video. In step 382, a center portion of an image is displayed on a display at a first scale. In step 384, first and second side portions of the image are displayed adjacent the center portion. The first and second side portions are displayed at a second scale higher than the first scale.

For anamorphic video in the horizontal and vertical directions, in step 386, a top portion and a bottom portion of the image are displayed on the display. The top and bottom portions are adjacent the center portion, the top and bottom portions being displayed at a third scale higher than the first scale.

Figure 16:
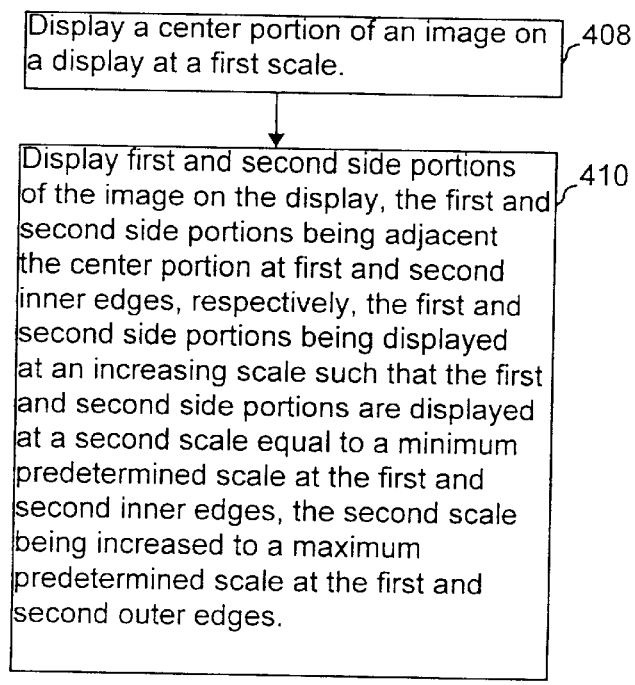
FIG. 16 is a flowchart of the method of displaying an image using graduated anamorphic video.
Figure 17:
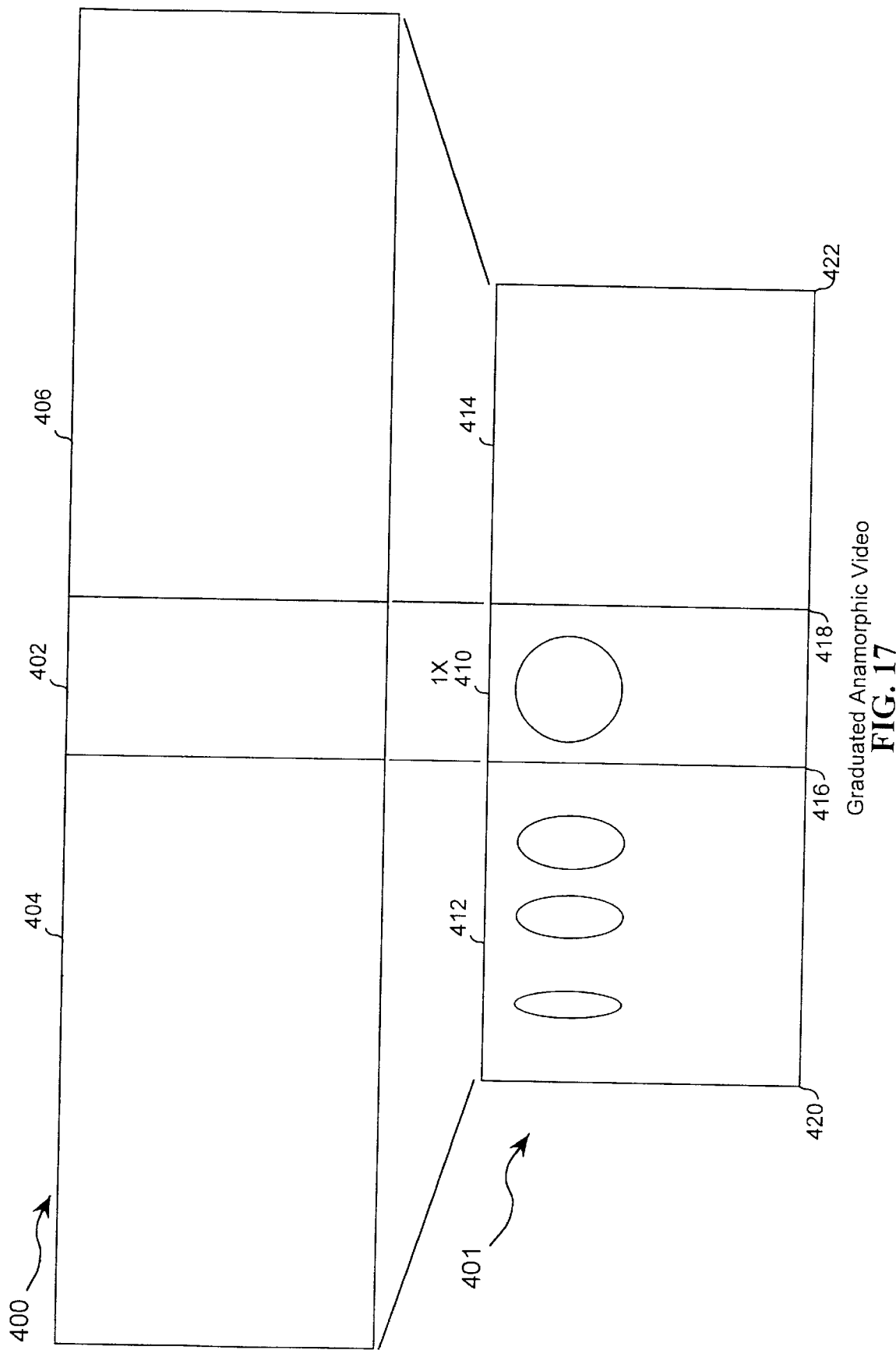
FIG. 17 is a diagram illustrating the mapping of a set of images on a display using graduated anamorphic video.

FIG. 16 depicts a flowchart for displaying an image 400 using graduated anamorphic video, while FIG. 17 depicts a display 401 using graduated anamorphic video. Referring to both FIGS. 16 and 17, the image 400 has three views 402, 404, 406. In step 408, the center view 402 of the image 400 is displayed at a first scale (1×) in region 410 of the display 401. In step 411, the first and second side views 404, 406 of the image 400 are displayed in side portions 412, 414 on the display 401. The first and second side portions 412, 414 are adjacent the center portion 408 at first and second inner edges, 416, 418, respectively. The first and second side portions 412, 414 have first and second outer edges, 420, 422, respectively. The first and second side portions 412, 414 are displayed at an increasing scale such that the first and second side portions 412, 414 are displayed at a second scale equal to a minimum predetermined scale at the first and second inner edges 416, 418. The second scale is increased to a maximum predetermined scale at the first and second outer edges 420, 422.

In one embodiment, the second scale is geometrically increased from the minimum predetermined scale to the maximum predetermined scale as a function of image position. In an alternate embodiment, the second scale is linearly increased from the minimum predetermined scale to the maximum predetermined scale as a function of image position. In yet another alternate embodiment, the second scale is increased from the minimum predetermined scale to the maximum predetermined scale using a predetermined weighting function. For example, the predetermined weighting function includes the following: a linear function, an exponential function, or a non-linear function. The linear function scales the image by a constant such as 1.5. The exponential function, such as $x^N$ scales the image at an increasing scale as a function of image position, such that the highest scaling takes place at the outer edges of the image. In one embodiment, N is equal to 1.5. A non-linear function varies the amount of scaling in the side portions of the image such that a particular area has a reduced scale and is surrounded by areas having a higher scale.

Figure 18:
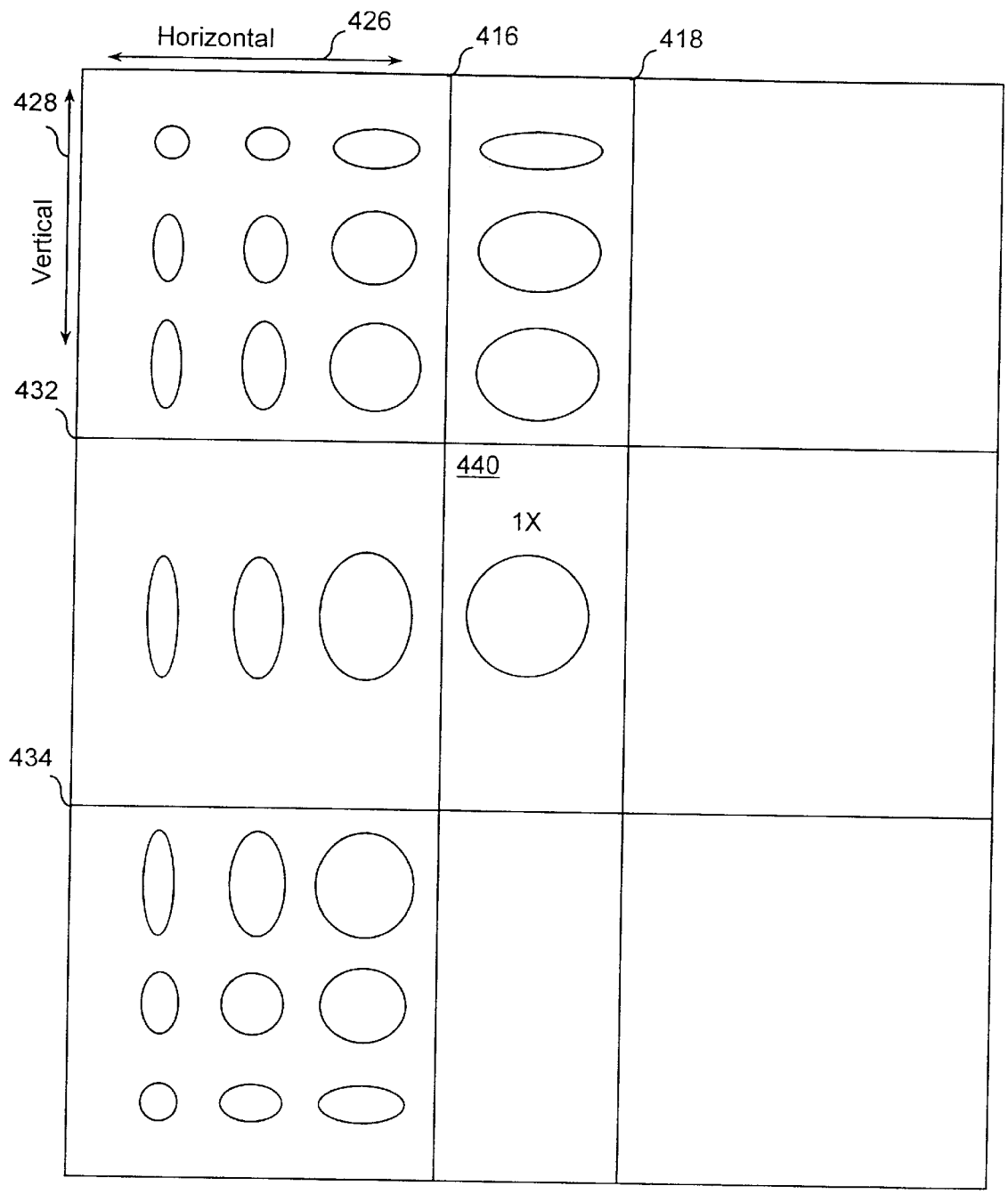
FIG. 18 is a diagram of a display using two-dimensional graduated anamorphic video.

FIG. 18 is a diagram of a display using the concept of graduated anamorphic video in both a horizontal and vertical dimension, 426, 428, respectively. Although FIG. 18 shows an embodiment that displays boundaries 416, 418, 432, 434, in a preferred embodiment a seamless display of the image without boundaries is displayed. In addition, the horizontal dimension may use a different weighting function from vertical dimension.

In another embodiment, the user can graphically select boundaries using a ruler and choose the scale for portions of the display.

Combination of Abrupt and Graduated Anamorphic Video

Referring back to FIG. 13, the display 300 can use both abrupt and graduated anamorphic video. For example, the image information in inner regions 312, 314 and 318 is displayed using abrupt anamorphic video, while the image information in outer regions 316 and 320 is displayed using graduated anamorphic video.

Combination of Foveal and Anamorphic Video

Figure 19:
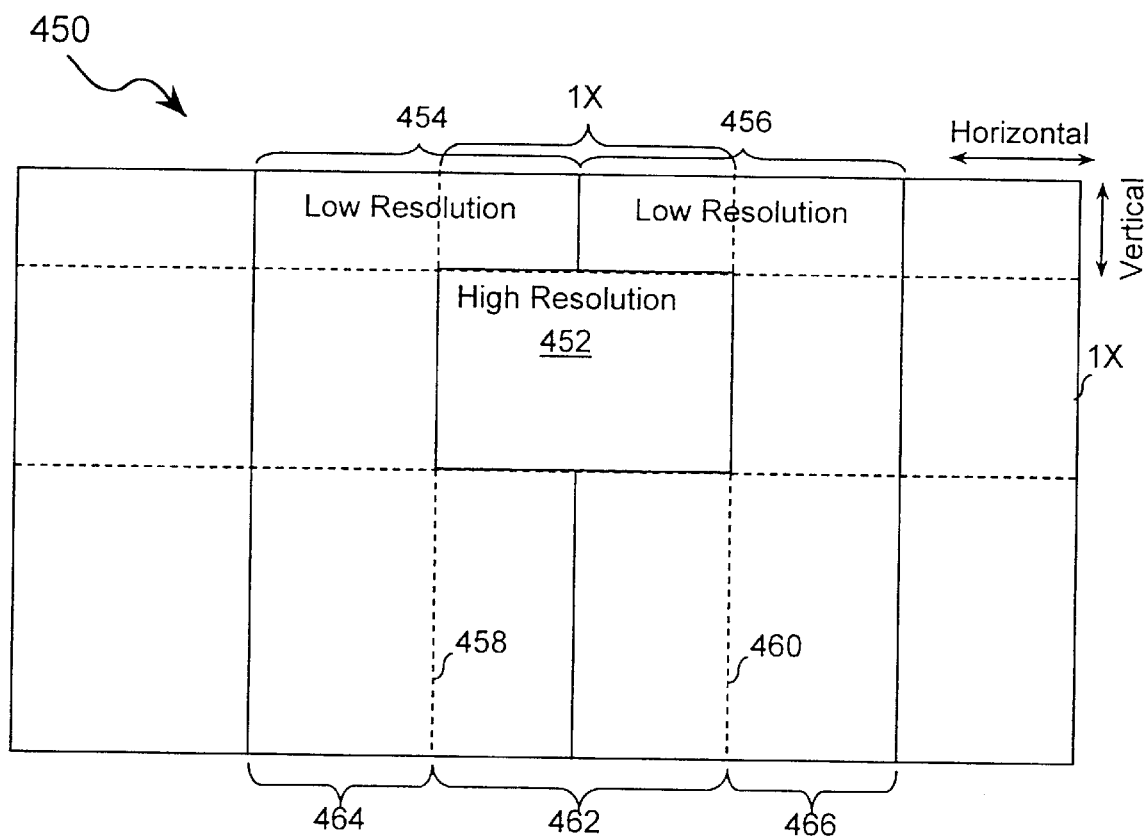
FIG. 19 is a diagram of a display that combines foveal and anamorphic video in a single image.

Referring now to FIG. 19, foveal and anamorphic video are combined in a single image. The low and high resolution images are combined into a seamless image as described above. The high resolution image in region 452 is displayed using foveal video and also at a 1× scale in both the horizontal and vertical dimensions, using anamorphic video. To combine this high resolution region 452 with the low resolution regions 454, 456 in the horizontal dimension, the edges 458, 460 of the high resolution region are identified. The low resolution image information between the edges 458, 460 in region 462 is displayed at same scale as the high resolution region 452. The image information in the low resolution regions 464, 466 that is outside region 462 is displayed using either abrupt or graduated anamorphic video as described above.

In another embodiment, foveal video is combined with anamorphic video in both the horizontal and vertical dimensions. The description for combining foveal video with anamorphic video in the horizontal dimension applies to combining foveal video with anamorphic video in the vertical dimension.

Preferably, the high resolution view is not scaled and is displayed inside the center portion of the image. In an alternate embodiment, the high resolution view is scaled.

Additional Digital Imaging

As mentioned above, with respect to step 256 of FIG. 10, additional digital imaging is performed to correct for lens imperfections. In FIG. 20, step 470 corrects for lens barrel distortion and step 472 corrects for lens light falloff.

In FIG. 21, image 474 has lens barrel distortion, while image 476 shows the image without barrel distortion. Lens barrel distortion rounds images such that a square object will appear to have rounded sides. In FIG. 22, the extent of the lens barrel distortion is shown by region 478 and the video information in region 478 is discarded. To correct for the distortion, a piecewise linear approximation to the desired video edge is performed by doing a geometric transformation on each of the triangles formed by the radial lines 480 of the image. FIG. 23 shows the corrected image.

Figure 24:
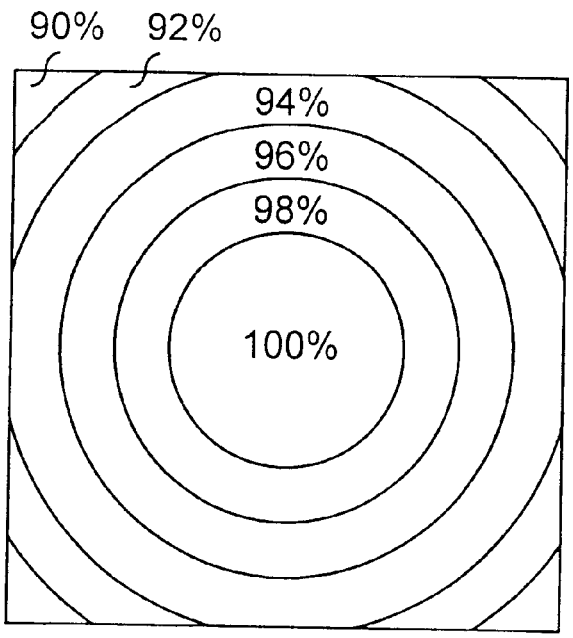
FIG. 24 is a lens intensity map for lens light falloff.
Figure 25:
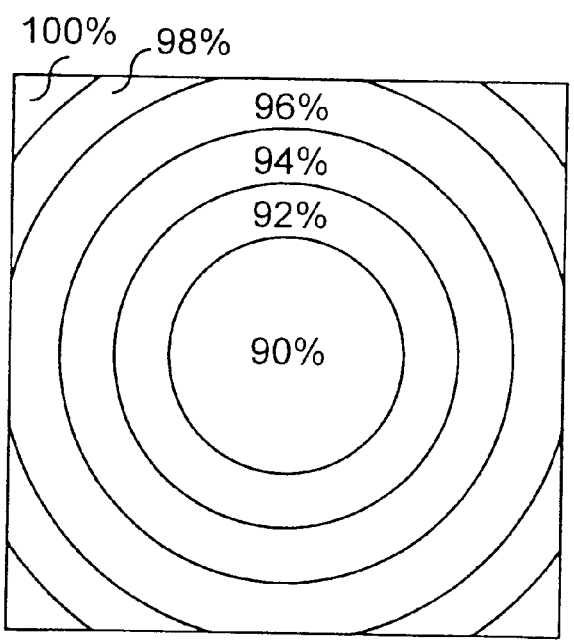
FIG. 25 is an opacity map used in a texture mapping technique for correcting for lens light falloff.

With inexpensive lenses, images tend to be brighter at the center and dimmer at the edges. In FIG. 24, a lens intensity map shows the radial decrease in light intensity from 100% at the center to 90% at the edges. To correct lens light falloff, one of the following two techniques is used. In a first technique, a black background is rendered and the image is texture mapped onto an opacity map. As shown in FIG. 25, the opacity map has concentric rings of different opacity chosen to correct for lens light falloff. The first technique does not result in final intensities of 100%, but is fast since it can be performed automatically by texture mapping hardware on a graphics card.

In a second technique, the colors of each pixel in the video source data are multiplied by the inverse of the corresponding value in the lens intensity map of FIG. 24. This second technique requires processing by the CPU and is slower than the first technique. However, the second technique provides final intensities up to 100%.

These digital imaging techniques to correct for distortion and light falloff caused by lens imperfections are done at the user station after the image is received from the robot. Alternately, the corrections for lens barrel distortion and lens light falloff are done at the robot prior to transmitting the image. In another alternate embodiment, these digital imaging techniques to correct for lens imperfections are performed on the user's image at the user station prior to transmitting the user's image to the robot.

An Exemplary User Station

Figure 26:
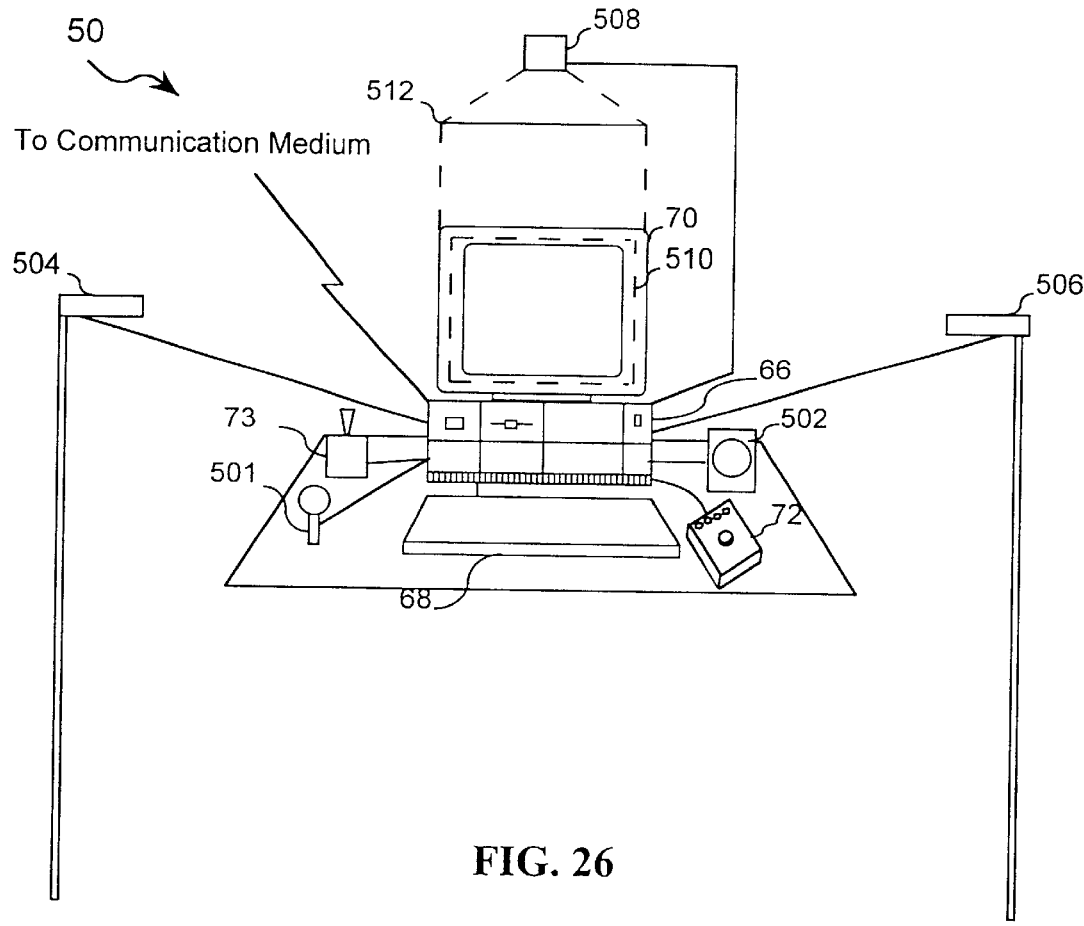
FIG. 26 is a diagram of a user station showing the camera configuration.

In FIG. 26, an exemplary user station 50 has a CPU 66, keyboard 68, mouse 72, display 70, joystick 73, microphone 501, and at least one speaker 502. In an alternate embodiment, the user station 50 is portable, such as a laptop computer, with a wireless network connection.

The mouse 72 is a 3-D mouse which controls the robot's arms. The joystick is 73 is a force feedback joystick that provides the user with tactile feedback. In one embodiment, the distance sensor on the robot detects the distance of the robot from objects and the robot transmits a distance signal representing the distance. In response to the distance signal, the user station 50 increases the amount of force required to move the joystick 73 as the distance from the robot to the object decreases.

In another embodiment, the accelerometer on the robot sends acceleration signals indicative of motion to the CPU on the robot, which are transmitted to the user station. In response to the acceleration signals, the user station 50 modulates the forces output by the joystick. Therefore, if the robot is moving down a bumpy hallway, the accelerometer will detect changes in acceleration, and in response the user will "feel" the bumps.

Two side cameras 504, 506 connect to the CPU 66 to receive images of the user's profile. A third camera 508 receives an image with the front view of the user. In one embodiment, the third camera 508 is positioned and focused on the user's head to directly receive the front view of the user. Inside the user station 50, the video image data is processed as described above with respect to FIGS. 6 and 7 and transmitted to the robot over the communication medium for display.

To improve the sense of eye contact between the user and remote observers interacting with the robot, the third camera 508 indirectly receives the user's image. A partially reflective mirror 510 is placed at an angle, preferably forty-five degrees, in front of the display 70. The partially reflective mirror 510 receives the user's image and reflects a portion of the light with the user's image up to a mirror 512 which reflects the incoming light to the third camera 508. Preferably, mirror 512 is also at an angle of forty-five degrees. Although the partially reflective mirror 510 blocks some of the light from the display 70 from reaching the user, the partially reflective mirror 510 permits a sufficient amount of light from the display 70 to reach the user without impairing the image quality that the user sees on the display 70.

Figure 27:
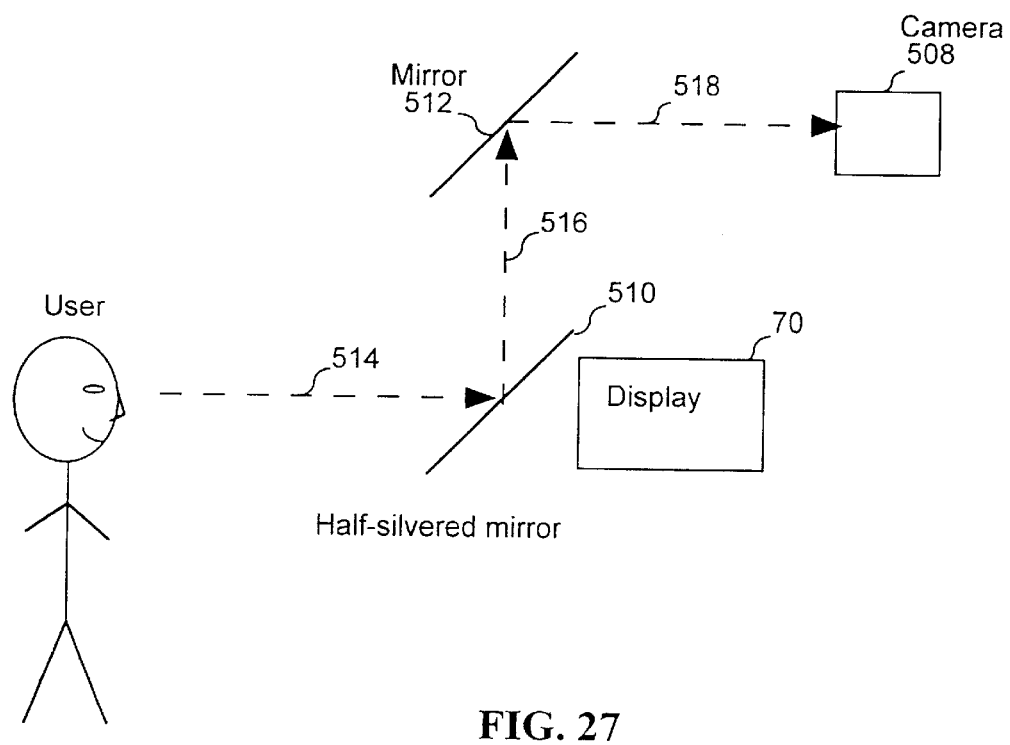
FIG. 27 is a diagram of the user station of FIG. 26 implemented with a partially-reflective mirror to improve eye-contact with the user.

In FIG. 27, a user's image is received 514 by the partially reflective mirror 510 which is positioned in front of the display 70. A portion of the incoming light 516 is reflected off the partially reflective mirror 510 to mirror 512. As indicated by dashed ray 518, the light 516 is reflected off mirror 512 and received by the third camera 508. In this way, a front view of the user is acquired in which the user appears to be looking directly into the camera 508, and therefore directly at the remote users, while in fact the user is looking directly at the display 70.

The Immersion Room

Figure 28:
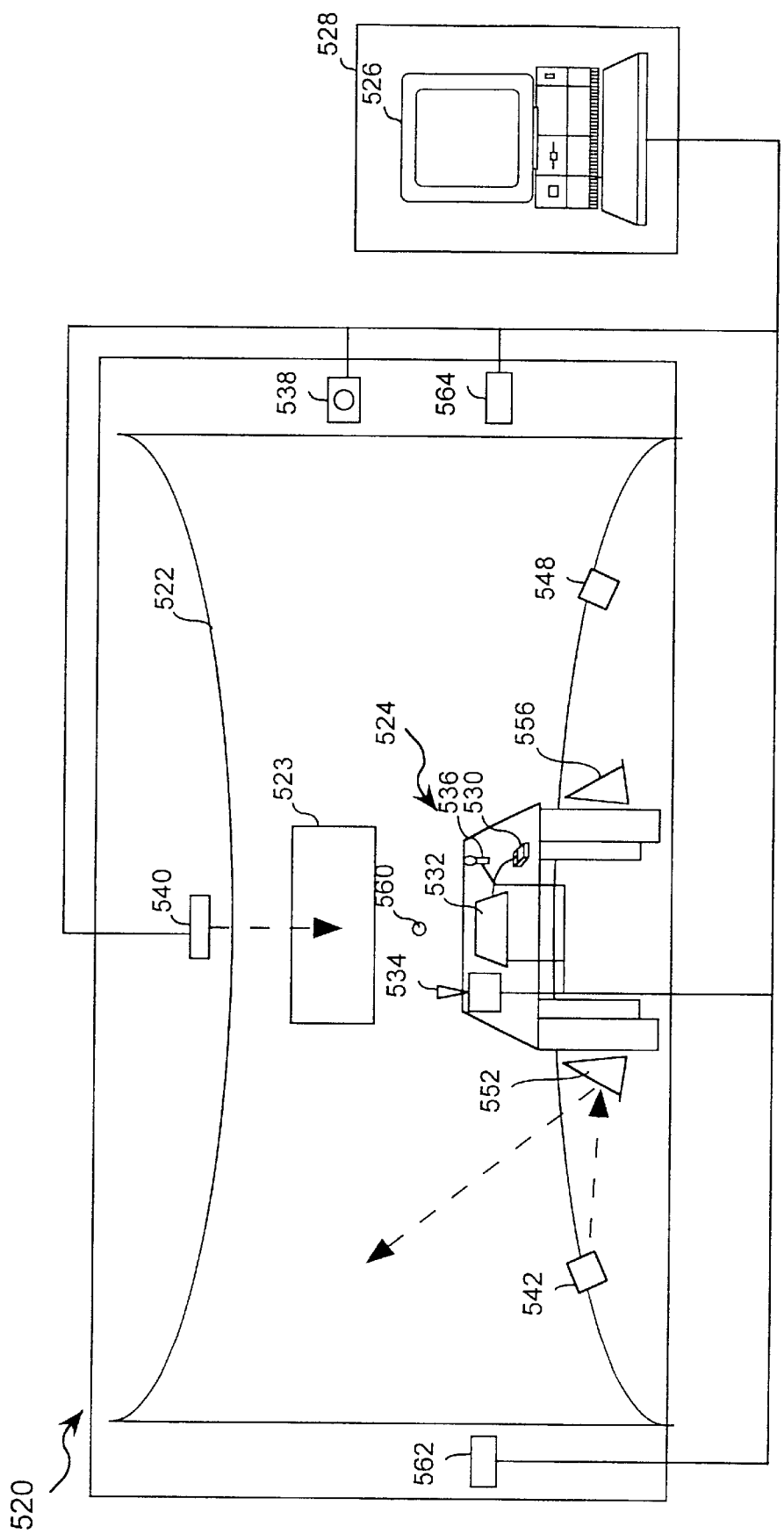
FIG. 28 is a diagram of an immersion room.

In FIG. 28, a "life-size" immersion room 520 functions as a user station and provides the user with a sense of being in the remote geographic location. Unlike a movie theater which is designed to present information visually for entertainment, the immersion room 520 is designed for live interaction with a robot at a remote location. The sense of presence is important for the user to be able to use the visual information to negotiate hallways, avoid obstacles and interact with others at the remote location. Therefore the types and amount of visual information needed for the robotic telepresence system distinguish the immersion room 520 from a typical movie theater.

The following compares the information presented in the immersion room 520 to normal human visual information. First, the immersion room 520 has a screen 522 that provides the user with a 150° visual field of view. The angle of view of the human eye is approximately 150°. Thus the angle of view of the immersion room 520 is close to the angle of view of the human eye. Second, the human eye can resolve fine detail, such as text, over a small angle. The immersion room 520 uses foveal video to provide the user with high resolution image 523 centered around an upper two-thirds vertical portion in the horizontal center of the screen 522. Third, to further enhance the sense of being at the remote location, the size of the screen 522 is sufficient to allow for a "life-size" projection of the remote surroundings. In one implementation, the screen 522 is six feet high. Fourth, the screen 522 is curved about the user. In one implementation, the user is positioned at or near the center point of the circular screen 522. Fifth, because the visual field of view is 150°, the user's peripheral vision will detect peripheral motion and changes in light intensity. As stated above, the human eye can detect movement and distinguish between light and dark even at seventy-five degrees with respect to the eye's optic axis. The immersion room 520 allows the user to detect movement and distinguish between light and dark at seventy-five degrees with respect to the eye's optic axis. In addition, with anamorphic video, the peripheral information available to the user can exceed the limitations of the size of the screen. With anamorphic video, the range of visual information available to the user can exceed that of normal human vision to over 180°, and even up to 360°.

In the immersion room 520, the user sits at a console 524 that is connected to a computer system 526 in an external location 528 outside the immersion room. At the console 524, the user uses a 3-D mouse 530, keyboard 532 and force feedback joystick 534 to control the robot in the same way as described above for the user workstation. The immersion room 520 also has a microphone 536 and at least one speaker 538 coupled to the computer 526 to transmit the user's voice to the robot and to provide audio feedback from the microphone on the robot at the remote location.

For foveal video, a projector 540 is mounted on a wall above and behind the user to project a high resolution image on a center portion 523 of the screen 522. Other projectors 542, 548 are positioned on the floor beneath the screen 522 and project an image onto mirrors 552, 556, respectively, which is reflected onto a corresponding portion of the screen 522.

The computer system 526 receives the image data from the robot, processes the received image data and transmits that image data to the projectors for viewing. The methods for correcting for barrel distortion and lens light falloff, aligning the images from each of the cameras and blending the overlapping edges of the received images apply to the images in the immersion room. Because the projectors 542, 548 are placed below the screen 522 on the floor, the displayed image in the immersion room 520 will be distorted by the keystone effect which will be discussed below.

To capture the user's image for transmission to the robot, a front camera 560 is disposed behind a pinhole 562 substantially in the center of the screen 522 facing the user. Two side cameras 562, 564 at the sides of the screen 522 capture the user's profile. The cameras 560, 562, 564 connect to the computer system 526. The computer system processes the user's image from the cameras using the methods described above.

Figure 29:
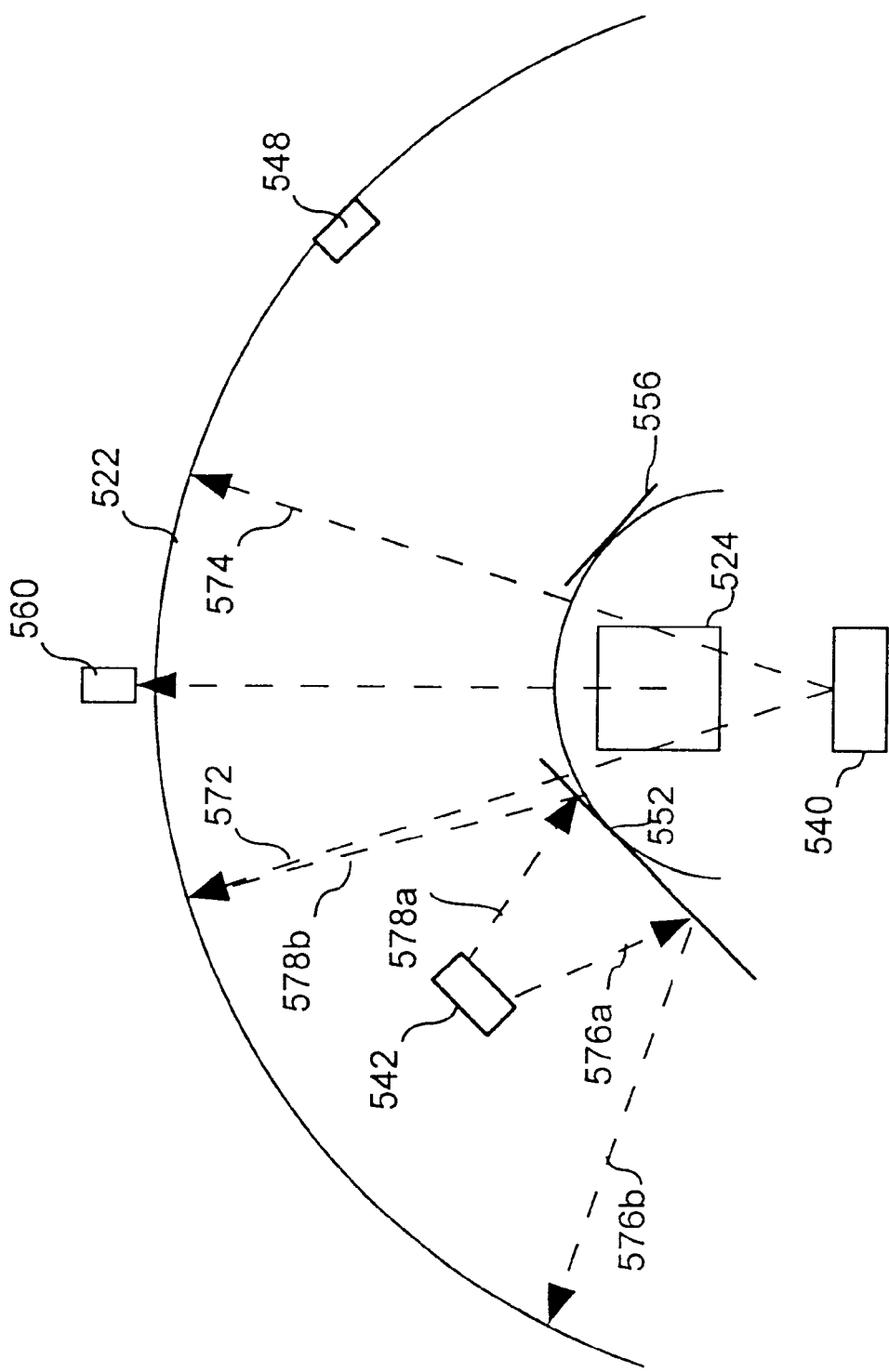
FIG. 29 is a top down view of the immersion room showing the location of the user, projectors, cameras and mirrors.

In FIG. 29, rays 572, 574 define the edges of the portion of the image projected by the high resolution projector 540 onto the screen 522. Rays 576a, 576b, 578a, and 578b define the edges of the portion of the image projected by projector 544 onto the screen 522 via mirror 552. The projectors for low resolution images have "holes" cut out of their images for the high resolution view, as with images on a single monitor. Camera 560 is positioned behind the pinhole in the screen 522 to receive the user's image.

Keystone Effect

Figure 30:
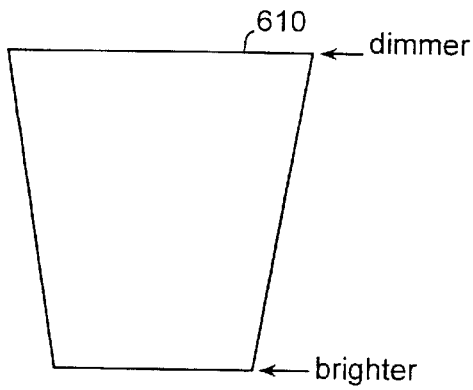
FIG. 30 is a diagram illustrating the keystone effect.

As shown in FIG. 30, the keystone effect causes each projector 542, 548 to produce a trapezoidal image 580, instead of a rectangular image. The trapezoidal image 580 is brighter at the bottom than at the top. The uncorrected intensity at any point in the trapezoid 580 is a function of the area covered by a pixel. The intensity is inversely proportional to the area covered by the pixel.

Figure 31:
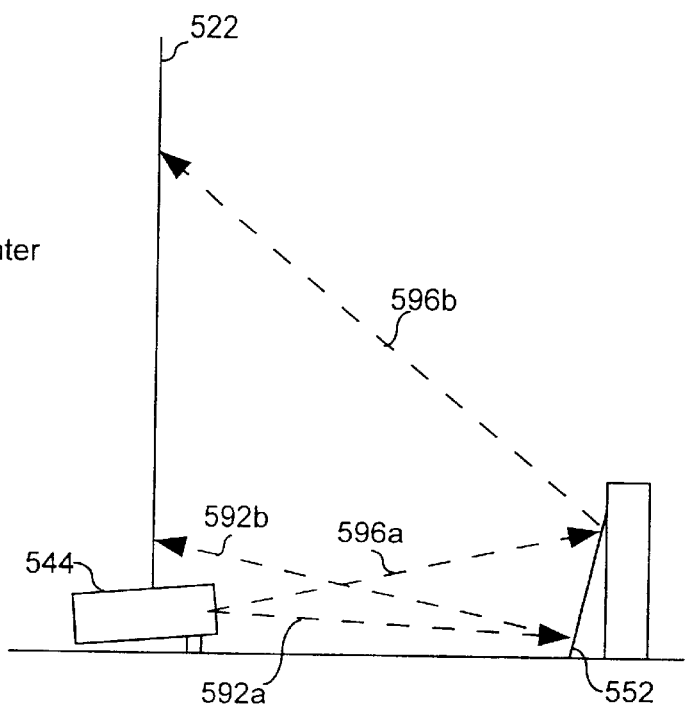
FIG. 31 illustrates the keystone effect using a side view of one projector configuration in the immersion room of FIG. 28.

In FIG. 31, projector 544 projects an image via mirror 552 onto the screen 522. Ray 592a defines the lower edge of the image and reflects off mirror 552 as ray 592b to define the lower edge of the image on the screen 522. Ray 596a defines the upper edge of the image and reflects off mirror 552 as ray 596b to define the upper edge of the image on the screen 522.

If uncorrected the image projected by projector 544 will exhibit the keystone effect. To eliminate the keystone effect, the projected image should be parallel to the screen 522. However, the keystone effect can be digitally eliminated.

Figure 32:
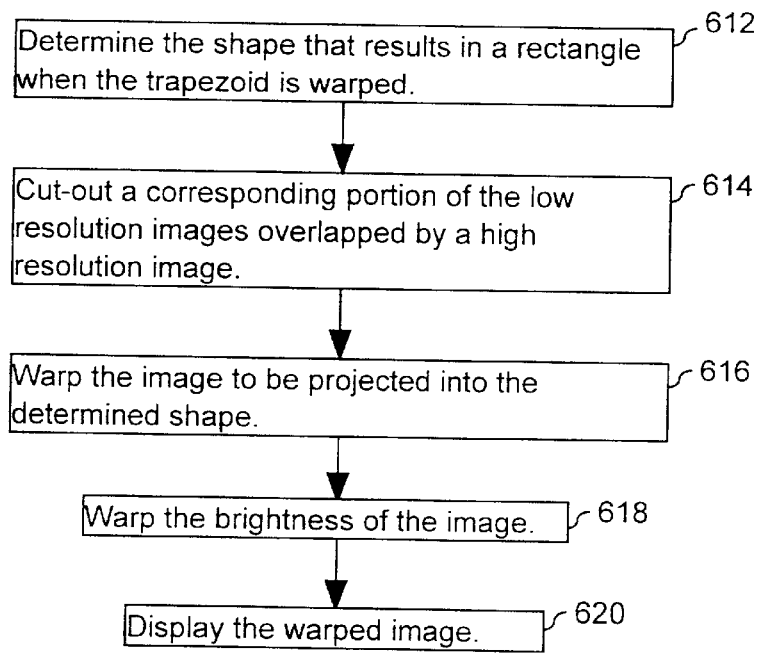
FIG. 32 is a flowchart of a method for correcting for keystone effect in the display.

FIG. 32 is a method for correcting for the keystone effect; this method will typically be executed by a video signal processor or other digital computer apparatus. In step 612, prior to the real time execution of the video image warping procedure, a determination is made of the shape that when the trapezoid is warped, results in a rectangle. During execution of the real time video image warping procedure, in step 614, for the low resolution images overlapped by the high resolution image, the procedure cuts out a corresponding portion of the low resolution images by not projecting light in the cut-out regions. In step 616, the image to be projected is warped to the determined shape. In step 618, the brightness of the image is warped to produce a projected image whose brightness distribution better matches that of the original image captured by the remote cameras. In step 620, the warped image is displayed via the low resolution projectors. In this way, the projected images will be displayed without noticeable distortion from the keystone effect and the user will be provided with a seamless image.

Computer System

Figure 33:
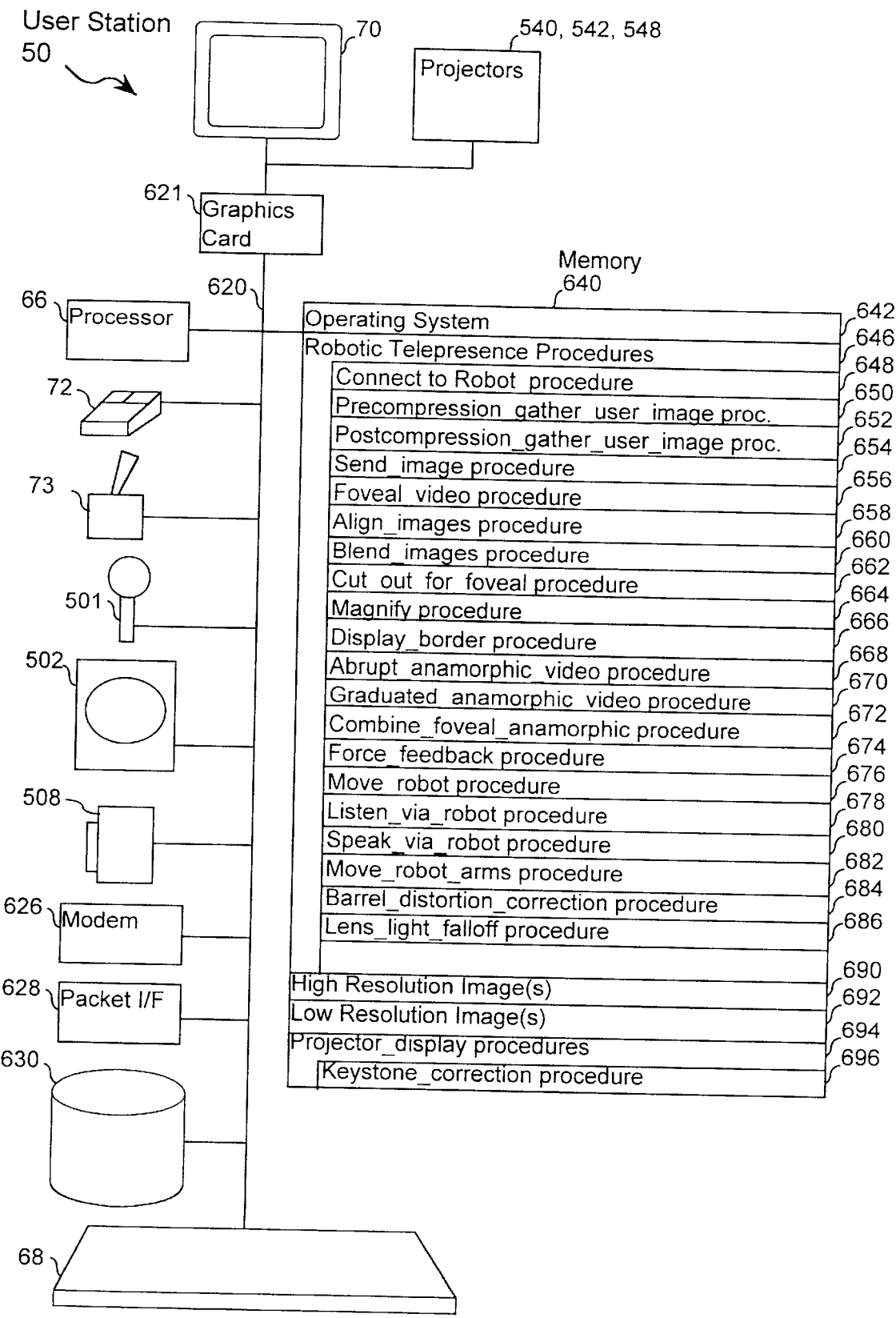
FIG. 33 is a diagram of the computer system of the user station and/or immersion room with procedures implementing the methods of the present invention in memory.

FIG. 33 is a diagram of the user station and the procedures implementing the methods of the present invention in memory. The user station 50 is a computer system in which the following components connect to a system bus 620 and includes:

a processor 66;

a graphics card 621 that connects to a display 70;

a mouse 72, preferably a 3-D mouse;

a force feedback joystick 73 as described above;

at least one microphone 501 for sensing the user's voice to transmit to the robot;

at least one speaker 502 for playing the sounds detected by the microphone on the robot;

at least one camera 508, and preferable three cameras 504, 506 and 508 for acquiring a front view of the user, and profile views as described above;

a modem 626 and/or a packet interface 628 for connecting the robot to the communications medium, such as the Internet;

a disk drive 630;

a keyboard 68; and a memory 640, such as a semiconductor memory, for storing procedures. The procedures can also be stored on the disk drive 630.

The memory 640 stores an operating system 642 such as UNIX™ (trademark of UNIX System Laboratories, Inc.) and robotic telepresence procedures 646 which are executed by the processor 66. The robotic telepresence procedures 646 include the following:

A connect_to_robot procedure 648 that establishes a connection via the packet interface 628 and the communication medium from the robot to the user station; Alternately the connect_to_robot procedure 648 establishes the connection via modem 626;

The precompression_gather_user_image procedure 650 that implements the method of FIG. 6;

The post-compression_gather_user_image procedure 652 that implements the method of FIG. 7;

A send_image procedure 654 that sends the image of the user from the cameras to the robot;

The foveal_video procedure 656 that implements the methods of FIGS. 9 and 10;

An align_images procedure 658 that aligns images;

A blend_images procedure 660 that blends images as described above;

A cut_out_for_foveal procedure 662 that cuts out a region in the low resolution images for displaying the high resolution image;

A magnify procedure 664 that magnifies a portion of the display;

A display border procedure 666 that displays a border around the high resolution image as shown in FIG. 11;

An abrupt_anamorphic_video procedure 668 that implements the method of FIG. 15;

A graduated_anamorphic_video procedure 670 that implements the method of FIG. 16;

A combine_foveal_anamorphic procedure 672 that combines the methods of foveal and anamorphic video in a single display as described above;

A force_feedback procedure 674 that increases the amount of force needed to move the joystick 73 in response to the distance sensor from the robot;

A move_robot procedure 676 that sends signals to the move the robot in response to the joystick 73; alternately, the signals are sent in response to the mouse 72.

A listen_via_robot procedure 678 that receives audio signals transmitted by the robot and plays the audio signal on the speaker 502;

A speak_via_robot procedure 680 that receives audio signals from the user via microphone 501 and transmits the audio signals to the robot;

A move_robot_arms procedure 682 that moves the robot arms in response to the 3-D mouse;

A barrel_distortion_correction procedure 684 that corrects for barrel distortion in the received images as discussed with respect to FIGS. 20–23;

A lens_light_falloff procedure 686 that corrects for reduction of light intensity at the edges of the lens as discussed with respect to FIGS. 20, 24–25;

The memory 620 also stores the high resolution image(s) 690 and the low resolution images 692.

The computer system for the immersion room is the same as the computer system described above for the user station with the following exceptions and additions. Projectors 542, 548 are used in place of or, alternately, in addition to the display 70. The immersion room computer system includes a set of projector display procedures 694 that include:

A keystone_correction procedure 698 that corrects for keystone effects as shown in FIG. 26.

Figure 34:
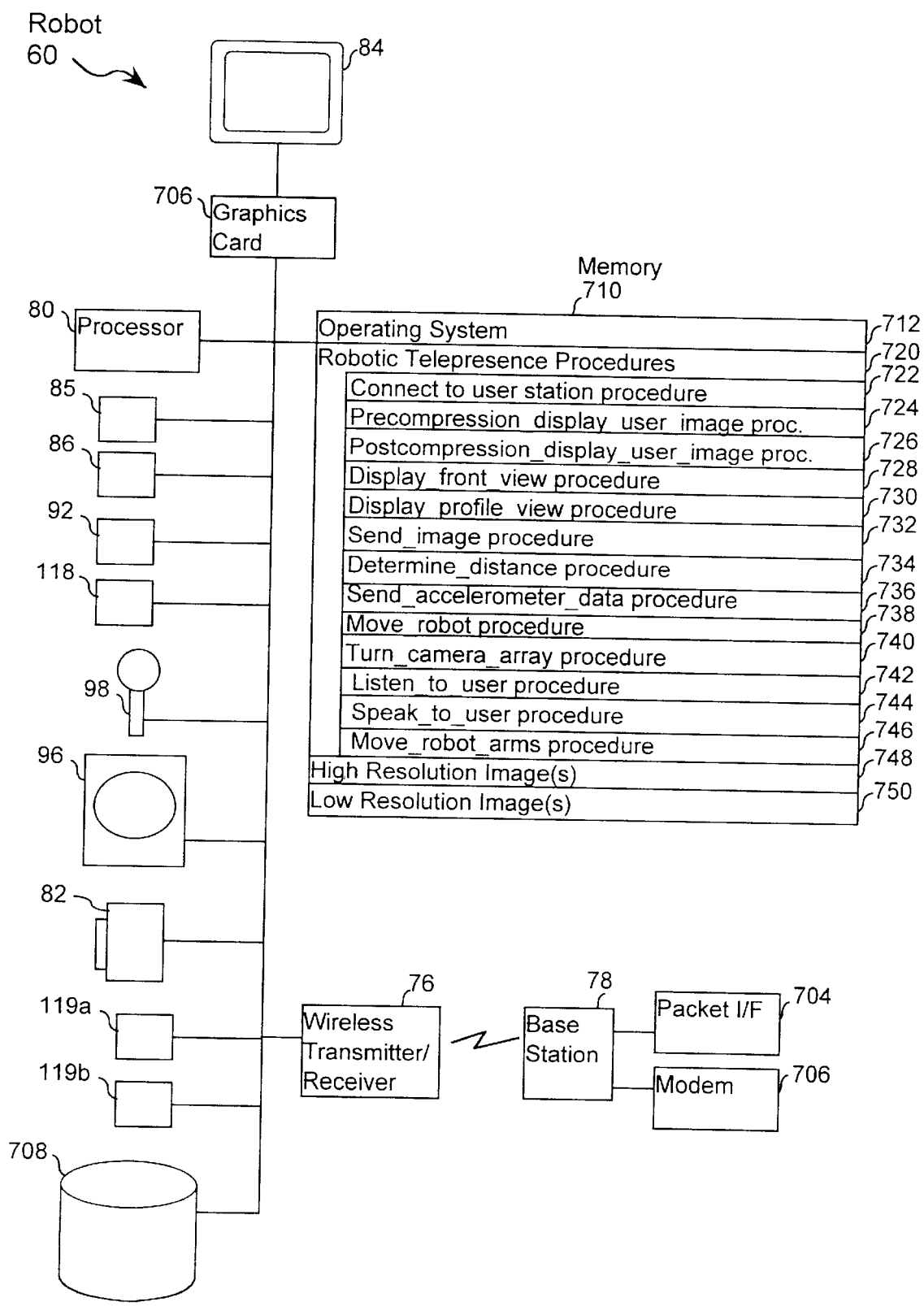
FIG. 34 is a diagram of the computer system of the robot with procedures implementing the methods of the present invention in memory.

In FIG. 34, the computer system on the robot 50 implements the methods of the present invention in memory. The robot's computer system includes the following components that connect to a system bus 702 and includes:

the processor 80;

the display 84 for displaying the front and profile views of the user;

a graphics card 706 for processing the graphic data to display the images via the projectors 540, 542 and 548, and an optional display 70;

the distance sensor 85 as described above;

the accelerometer 86 as described above;

the motor 92 to move the robot;

the microphone 98 for sensing the sounds around the robot to transmit to the user;

the speaker 96 for playing the sounds detected by the microphone at the user station;

the camera array 82 as described above;

robot arms 119a and 119b;

a wireless communication transmitter/receiver 76 that transmits and receives signals from the wireless base station 78; the wireless base station 78 connects to the communication medium via a packet interface 704 such as ethernet or, alternately, a modem 706;

a disk drive 708; and a memory 710, such as a semiconductor memory, for storing procedures and data. The procedures and data can also be stored on the disk drive 708.

The memory 710 stores an operating system 712 such as UNIX and robotic telepresence procedures 720 which are executed by the processor 80. The robotic telepresence procedures 720 include:

A connect_to_user_station procedure 722 that establishes the communication connection via the wireless transmitter/receiver 76 to the user station or immersion room.

The precompression_display_user_image procedure 724 that implements the method of FIG. 6;

The post_compression_display_user_image procedure 726 that implements the method of FIG. 7;

A display_front_view procedure 728 that displays the front view of the user using either the precompression_display_user_image procedure 724 or the post_compression display_user_image procedure 726;

A display_profile_view procedure 730 that display the profile view of the user using either the precompression_display_user_image procedure 724 or the post_compression_display_user_image procedure 726;

A send_image procedure 732 that sends the images from the camera array to the user station;

A determine_distance procedure 734 that receives the sensed distance information from the distance sensor 85, determines the distance from the sensed distance information and sends the distance to the user station or immersion room;

A send_accelerometer_data procedure 736 that receive the acceleration information from the accelerometer, and sends the acceleration data to the user station or immersion room;

A move_robot procedure 738 that is responsive to the move_robot procedure at the user station that controls motor 92 and causes the robot to move;

A turn_camera_array procedure 740 that is responsive to the commands from the user station that controls motor 118 to turn the robot's head and camera array 82;

A listen_to_user procedure 742 that receives audio signals transmitted from the user station or immersion room and plays the audio signals on the speaker 96;

A speak_to_user procedure 744 that receives audio signals from the microphone 98 on the robot and transmits the audio signals to the user station or immersion room; and A move_robot_arms procedure 746 that communicates with the move_robot_arms procedure at the user station to move the robot arms 119a, 119b.

The memory 710 also stores high resolution images 748 and low resolution images 750.

Although the invention has been illustrated using a single computer system to drive all projectors, in a preferred embodiment, each projector is driven by a separate display computer system and the display computer systems are networked with a master computer to coordinate the displaying of the information.

Although the invention has been described with respect to visual video information, sensors other than video cameras can be used to provide the video images. For example, in one alternate embodiment, infrared sensors are used.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of displaying an image on a display, comprising the steps of:

portioning the image into center, first side, and second side portions, the first and second side portions of the image being adjacent the center portion of the image, wherein the center, first side and second side portions of the image together represent a single contiguous field of view;

displaying the center portion of the image on the display the center display portion being displayed at a first scale; and displaying the first and second side portions of the image on the display, the first and second side displayed portions being adjacent the center displayed portion, the first and second side displayed portions being displayed at a second scale higher than the first scale.

2. The method of claim 1 wherein the first scale is equal to one whereby the center portion of the image is displayed in an unscaled format.

3. The method of claim 1 wherein the first and second side portions of the image are scaled in one dimension.

4. The method of claim 1 wherein the first and second side portions of the image are scaled in two dimensions.

5. The method of claim 1 further comprising the step of:

portioning the image into top and bottom portions, the top and bottom portions of the image being adjacent the center portion of the image, wherein the center, first side, second side, top, and bottom portions of the image together represent a single contiguous field of view;

displaying the top portion and the bottom portion of the image on the display, the top and bottom displayed portions being adjacent the center displayed portion, the top and bottom displayed portions being displayed at a third scale higher than the first scale.

6. A method for displaying an image on a display, comprising the steps of:

portioning the image into center, first side, and second side portions, the first and second side portions of the image being adjacent the center portion of the image, wherein the center, first side and second side portions of the image together represent a single contiguous field of view;

displaying the center portion of the image on the display, the center displayed portion being displayed at a first scale; and displaying the first and second side portions of the image on the display, the first and second side displayed portions being adjacent the center displayed portion at first and second inner edges, respectively, the first and second side displayed portions having first and second outer edges, respectively, the first and second side displayed portions being displayed at an increasing scale such that the first and second side displayed portions are displayed at a second scale equal to a minimum predetermined scale at the first and second inner edges, the second scale being increased to a maximum predetermined scale at the first and second outer edges.

7. The method of claim 6 wherein the second scale is geometrically increased from the minimum predetermined scale to the maximum predetermined scale.

8. The method of claim 6 wherein the second scale is linearly increased from the minimum predetermined scale to the maximum predetermined scale.

9. A method of displaying an image on a display, comprising the steps of:

portioning the image into a first portion and at least one second portion, the at least one second portion of the image being adjacent the first portion of the image, wherein the first portion of the image and the at least one second portion of the image together represent a single contiguous field of view;

displaying the first portion of the image on the display, the first displayed portion being displayed at a first scale; and displaying the at least one second portion of the image on the display, the at least one second displayed portion being adjacent the first displayed portion, the at least one second displayed portion being displayed at a second scale higher than the first scale.

10. The method of claim 9 wherein the first portion of the image is a center portion of the image, and the at least one second portion of the image is a side portion of the image.

11. A computer system for displaying an image on a display, the computer system comprising:

a processor;

a display coupled to the processor; and a memory storing instructions that cause the processor to:

portion the image into a first portion and at least one second portion, the at least one second portion of the image being adjacent the first portion of the image, wherein the first portion of the image and the at least one second portion of the image together represent a single contiguous field of view;

display the first portion of the image on the display, the first displayed portion being displayed at a first scale; and display the at least one second portion of the image on the display, the at least one second displayed portion being adjacent the first displayed portion, the at least one second displayed portion being displayed at a second scale higher than the first scale.

12. The computer system of claim 11 wherein the second scale is increased from a minimum predetermined scale to a maximum predetermined scale.

13. A computer system for displaying an image on a display, the computer system comprising:

a processor;

a display coupled to the processor; and a memory storing instructions that cause the processor to:

portion the image into center, first side, and second side portions, the first and second side portions of the image being adjacent the center portion of the image, wherein the center, first side and second side portions of the image together represent a single contiguous field of view;

display the center portion of the image on the display, the center displayed portion being displayed at a first scale; and display the first and second side portions of the image on the display, the first and second side displayed portions being adjacent the center displayed portion, the first and second side displayed portions being displayed at a second scale higher than the first scale.

14. The computer system of claim 13 wherein the first scale is equal to one whereby the center portion of the image is displayed in an unscaled format.

15. The computer system of claim 13 wherein the first and second side portions of the image are scaled in one dimension.

16. The computer system of claim 13 wherein the first and second side portions of the image are scaled in two dimensions.

17. The computer system of claim 13 wherein the memory stores instructions that cause the processor to:

portion the image into top and bottom portions, the top and bottom portions of the image being adjacent the center portion of the image, wherein the center, first side, second side, top, and bottom portions of the image together represent a single contiguous field of view;

display the top portion and the bottom portion of the image on the display, the top and bottom displayed portions being adjacent the center displayed portion, the top and bottom displayed portions being displayed at a third scale higher than the first scale.

18. A computer system for displaying an image on a display, the computer system comprising:

a processor;

a display device coupled to the processor; and a memory storing instructions that cause the processor to:

portion the image into center, first side, and second side portions, the first and second side portions of the image being adjacent the center portion of the image, wherein the center, first side and second side portions of the image together represent a single contiguous field of view;

display the center portion of the image on the display device, the center displayed portion being displayed at a first scale; and display the first and second side portions of the image on the display device, the first and second side displayed portions being adjacent the center displayed portion at first and second inner edges, respectively, the first and second side displayed portions having first and second outer edges, respectively, the first and second side displayed portions being displayed at an increasing scale such that the first and second side displayed portions are displayed at a second scale equal to a minimum predetermined scale at the first and second inner edges, the second scale being increased to a maximum predetermined scale at the first and second outer edges.

19. The computer system of claim 18 wherein the memory stores instructions that cause the processor to geometrically increase the second scale from the minimum predetermined scale to the maximum predetermined scale as a function of image position.

20. The computer system of claim 18 wherein the memory stores instructions that cause the processor to linearly increase the second scale from the minimum predetermined scale to the maximum predetermined scale as a function of image position.

21. A computer program product, the computer program product for use in conjunction with a computer system having a display device, the computer program product comprising a computer readable storage medium and a computer program mechanism embedded therein, the computer program mechanism comprising:

an initial set of instructions that portion an image into a first portion and at least one second portion, the at least one second portion of the image being adjacent the first portion of the image, wherein the first portion of the image and the at least one second portion of the image together represent a single contiguous field of view;

a first set of instructions that display the first portion of the image on the display device, the first displayed portion being displayed at a first scale; and a second set of instructions that display the at least one second portion of the image on the display device, the at least one second displayed portion being adjacent the first displayed portion, the at least one second displayed portion being displayed at a second scale higher than the first scale.

22. A computer program product, the computer program product for use in conjunction with a computer system having a display device, the computer program product comprising a computer readable storage medium and a computer program mechanism embedded therein, the computer program mechanism comprising:

an initial set of instructions that portion an image into center, first side, and second side portions, the first and second side portions of the image being adjacent the center portion of the image, wherein the center, first side and second side portions of the image together represent a single contiguous field of view;

a first set of instructions that display the center portion of the image on the display device, the center displayed portion being displayed at a first scale; and a second set of instructions that display the first and second side portions of the image on the display device, the first and second side displayed portions being adjacent the center displayed portion, the first and second side displayed portions being displayed at a second scale higher than the first scale.

23. The computer program product of claim 22 wherein the first scale is equal to one whereby the center portion of the image is displayed in an unscaled format.

24. The computer program product of claim 22 wherein the first and second side portions of the image are scaled in one dimension.

25. The computer program product of claim 22 wherein the first and second side portions of the image are scaled in two dimensions.

26. The computer program product of claim 22 further comprising:

a second initial set of instructions that portion an image into top and bottom portions, the top and bottom portions of the image being adjacent the center portion of the image, wherein the center, first side, second side, top, and bottom portions of the image together represent a single contiguous field of view;

a third set of instructions that display the top portion and the bottom portion of the image on the display device, the top and bottom displayed portions being adjacent the center displayed portion, the top and bottom displayed portions being displayed at a third scale higher than the first scale.

27. A computer program product, the computer program product for use in conjunction with a computer system having a display device, the computer program product comprising a computer readable storage medium and a computer program mechanism embedded therein, the computer program mechanism comprising:

an initial set of instructions that portion an image into center, first side, and second side portions, the first and second side portions of the image being adjacent the center portion of the image, wherein the center, first side and second side portions of the image together represent a single contiguous field of view;

a first set of instructions that display the center portion of the image on the display device, the center displayed portion being displayed at a first scale; and a second set of instructions that display the first and second side portions of the image on the display device, the first and second side displayed portions being adjacent the center displayed portion at first and second inner edges, respectively, the first and second side displayed portions having first and second outer edges, respectively, the first and second side displayed portions being displayed at an increasing scale such that the first and second side displayed portions are displayed at a second scale equal to a minimum predetermined scale at the first and second inner edges, the second scale being increased to a maximum predetermined scale at the first and second outer edges.

28. The computer program product of claim 27 wherein the second set of instructions geometrically increases the second scale from the minimum predetermined scale to the maximum predetermined scale as a function of image position.

29. The computer program product of claim 27 wherein the second set of instructions linearly increases the second scale from the minimum predetermined scale to the maximum predetermined scale as a function of image position.

30. The method of claim 1 wherein the image is an image of a contiguous field of view obtained from a single camera.

31. The method of claim 1 wherein the image is an image of a contiguous field of view obtained from a plurality of cameras that capture overlapping subsets of the contiguous field of view.

32. The method of claim 6 wherein the image is an image of a contiguous field of view obtained from a single camera.

33. The method of claim 6 wherein the image is an image of a contiguous field of view obtained from a plurality of cameras that capture overlapping subsets of the contiguous field of view.

34. The method of claim 9 wherein the image is an image of a contiguous field of view obtained from a single camera.

35. The method of claim 9 wherein the image is an image of a contiguous field of view obtained from a plurality of cameras that capture overlapping subsets of the contiguous field of view.

36. The method of claim 11 wherein the image is an image of a contiguous field of view obtained from a single camera.

37. The method of claim 11 wherein the image is an image of a contiguous field of view obtained from a plurality of cameras that capture overlapping subsets of the contiguous field of view.

38. The method of claim 13 wherein the image is an image of a contiguous field of view obtained from a single camera.

39. The method of claim 13 wherein the image is an image of a contiguous field of view obtained from a plurality of cameras that capture overlapping subsets of the contiguous field of view.

40. The method of claim 18 wherein the image is an image of a contiguous field of view obtained from a single camera.

41. The method of claim 18 wherein the image is an image of a contiguous field of view obtained from a plurality of cameras that capture overlapping subsets of the contiguous field of view.

42. The method of claim 21 wherein the image is an image of a contiguous field of view obtained from a single camera.

43. The method of claim 21 wherein the image is an image of a contiguous field of view obtained from a plurality of cameras that capture overlapping subsets of the contiguous field of view.

44. The method of claim 22 wherein the image is an image of a contiguous field of view obtained from a single camera.

45. The method of claim 22 wherein the image is an image of a contiguous field of view obtained from a plurality of cameras that capture overlapping subsets of the contiguous field of view.

46. The method of claim 27 wherein the image is an image of a contiguous field of view obtained from a single camera.

47. The method of claim 27 wherein the image is an image of a contiguous field of view obtained from a plurality of cameras that capture overlapping subsets of the contiguous field of view.

* * * * *